United States Patent
Rodriguez De Castro

(10) Patent No.: US 10,200,196 B1
(45) Date of Patent: *Feb. 5, 2019

(54) CRYPTOGRAPHIC ASIC WITH AUTONOMOUS ONBOARD PERMANENT STORAGE

(71) Applicant: Blockchain ASICs LLC, San Francisco, CA (US)

(72) Inventor: Edward L. Rodriguez De Castro, San Francisco, CA (US)

(73) Assignee: Blockchain ASICs LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/979,072

(22) Filed: May 14, 2018

Related U.S. Application Data

(60) Provisional application No. 62/662,544, filed on Apr. 25, 2018.

(51) Int. Cl.
| | | |
|---|---|---|
| *H04L 29/06* | (2006.01) | |
| *H04L 9/08* | (2006.01) | |
| *H04L 9/06* | (2006.01) | |
| *H04L 9/32* | (2006.01) | |

(52) U.S. Cl.
CPC .......... *H04L 9/0863* (2013.01); *H04L 9/0637* (2013.01); *H04L 9/0643* (2013.01); *H04L 9/0894* (2013.01); *H04L 9/3226* (2013.01); *H04L 2209/38* (2013.01)

(58) Field of Classification Search
CPC ... H04L 9/0863; H04L 9/3226; H04L 9/0637; H04L 2209/38
See application file for complete search history.

(56) References Cited

U.S. PATENT DOCUMENTS

| | | |
|---|---|---|
| 5,442,705 A | 8/1995 | Miyano |
| 5,774,552 A | 6/1998 | Grimmer |
| 6,581,162 B1 | 6/2003 | Angelo et al. |
| 6,708,273 B1 | 3/2004 | Ober et al. |
| 6,763,465 B1 | 7/2004 | Kelley et al. |
| 7,177,421 B2 | 2/2007 | Buer et al. |

(Continued)

FOREIGN PATENT DOCUMENTS

| | | |
|---|---|---|
| DE | 112017000394 T5 | 10/2018 |
| WO | WO-2017123902 A1 | 7/2017 |

OTHER PUBLICATIONS

U.S. Appl. No. 14/997,113, filed Jan. 15, 2016, Cryptographic ASIC Including Circuitry-Encoded Transformation Function.

(Continued)

*Primary Examiner* — Thaddeus J Plecha
(74) *Attorney, Agent, or Firm* — Schwegman Lundberg & Woessner, P.A.

(57) ABSTRACT

A cryptographic ASIC and method for autonomously storing data into a one-time programmable memory in isolation. Internal circuitry provides programming pulses of a given voltage magnitude and duration for changing the state of selected memory elements. Use of internal circuitry reduces pin count and increases reliability and security over devices relying on external circuitry to provide programming pulses. In one embodiment, the stored data comprises cryptographic data for enforcing a derivative key hierarchy for managing an information stream, such as a blockchain.

20 Claims, 14 Drawing Sheets

(56) References Cited

U.S. PATENT DOCUMENTS

| | | |
|---|---|---|
| 7,191,341 B2 | 3/2007 | Paaske et al. |
| 7,234,021 B1 | 6/2007 | Chilton |
| 7,472,369 B1 | 12/2008 | Bain et al. |
| 7,483,945 B2 | 1/2009 | Blumofe |
| 7,606,362 B1 | 10/2009 | Streicher et al. |
| 7,644,278 B2 | 1/2010 | Catherman et al. |
| 7,675,313 B1 | 3/2010 | Tang et al. |
| 7,681,103 B2 | 3/2010 | Devadas et al. |
| 7,725,738 B1 | 5/2010 | Langhammer et al. |
| 7,818,584 B1 | 10/2010 | Joyce et al. |
| 7,890,917 B1 | 2/2011 | Young et al. |
| 7,892,917 B2 | 2/2011 | Cho et al. |
| 7,971,017 B1 | 6/2011 | Mann et al. |
| 8,132,005 B2 | 3/2012 | Tarkkala et al. |
| 8,332,931 B1 | 12/2012 | Tran et al. |
| 8,347,096 B2 | 1/2013 | Hoornaert et al. |
| 8,402,241 B2 | 3/2013 | Miranda et al. |
| 8,683,210 B2 | 3/2014 | Devadas |
| 8,751,786 B1 | 6/2014 | Feng et al. |
| 8,751,855 B2 | 6/2014 | Yairi et al. |
| 8,782,396 B2 | 7/2014 | Ziola et al. |
| 9,479,328 B1 | 10/2016 | Wilburn et al. |
| 9,495,668 B1 | 11/2016 | Juels |
| 9,672,385 B2 | 6/2017 | Newell |
| 9,866,370 B2 | 1/2018 | Doi et al. |
| 9,893,885 B1 | 2/2018 | Miller et al. |
| 2001/0021927 A1 | 9/2001 | Laurent et al. |
| 2001/0044897 A1 | 11/2001 | Ishiguro et al. |
| 2002/0080958 A1 | 6/2002 | Ober et al. |
| 2002/0085710 A1 | 7/2002 | Clark et al. |
| 2002/0147918 A1 | 10/2002 | Osthoff et al. |
| 2002/0184512 A1 | 12/2002 | Cardoso |
| 2002/0199110 A1 | 12/2002 | Kean |
| 2003/0056139 A1 | 3/2003 | Murray et al. |
| 2004/0005051 A1 | 1/2004 | Wheeler et al. |
| 2004/0019789 A1 | 1/2004 | Buer |
| 2004/0088552 A1 | 5/2004 | Candelore |
| 2005/0132184 A1 | 6/2005 | Palliyil et al. |
| 2006/0041510 A1 | 2/2006 | Gagnon et al. |
| 2006/0059368 A1 | 3/2006 | Fayad et al. |
| 2006/0072748 A1 | 4/2006 | Buer |
| 2006/0184799 A1* | 8/2006 | Seo .................. G06F 21/79 713/182 |
| 2006/0248346 A1 | 11/2006 | Shiomi et al. |
| 2006/0291650 A1 | 12/2006 | Ananth |
| 2007/0024316 A1 | 2/2007 | Dellow |
| 2007/0090920 A1 | 4/2007 | Canter et al. |
| 2007/0208918 A1 | 9/2007 | Harbin et al. |
| 2007/0230693 A1* | 10/2007 | Mueller .................. G06F 7/582 380/46 |
| 2007/0245159 A1* | 10/2007 | Youn .................. H04L 9/3236 713/187 |
| 2007/0294497 A1 | 12/2007 | Chen |
| 2008/0148001 A1 | 6/2008 | Gehrmann et al. |
| 2008/0170694 A1 | 7/2008 | Ryan et al. |
| 2008/0235772 A1* | 9/2008 | Janzen .................. G06F 21/31 726/5 |
| 2009/0024784 A1 | 1/2009 | Wang et al. |
| 2009/0067686 A1 | 3/2009 | Boshra et al. |
| 2009/0169019 A1 | 7/2009 | Bauchot et al. |
| 2009/0238362 A1 | 9/2009 | Kitani et al. |
| 2009/0257595 A1 | 10/2009 | De Cesare et al. |
| 2009/0259855 A1 | 10/2009 | De Cesare et al. |
| 2009/0320127 A1 | 12/2009 | Hong |
| 2010/0088752 A1 | 4/2010 | Nagulakonda et al. |
| 2010/0095357 A1 | 4/2010 | Willis et al. |
| 2010/0220853 A1* | 9/2010 | Schneider .................. H04L 9/0643 380/29 |
| 2011/0066835 A1 | 3/2011 | Kothari et al. |
| 2011/0119293 A1 | 5/2011 | Taylor et al. |
| 2011/0179289 A1 | 7/2011 | Guenther |
| 2011/0225128 A1 | 9/2011 | Jarrett et al. |
| 2011/0268269 A1* | 11/2011 | Spalka .................. H04L 9/0643 380/44 |
| 2011/0311051 A1 | 12/2011 | Resch et al. |
| 2012/0060039 A1 | 3/2012 | Leclercq |
| 2012/0066504 A1 | 3/2012 | Hird et al. |
| 2012/0069995 A1 | 3/2012 | Matthews, Jr. |
| 2012/0079287 A1 | 3/2012 | Leclercq |
| 2012/0151223 A1 | 6/2012 | Conde Marques et al. |
| 2012/0309348 A1 | 12/2012 | De Atley et al. |
| 2013/0065669 A1 | 3/2013 | Michaelson et al. |
| 2013/0230166 A1 | 9/2013 | Bauchot et al. |
| 2014/0016776 A1 | 1/2014 | Van Foreest et al. |
| 2014/0156531 A1 | 6/2014 | Poon et al. |
| 2014/0164779 A1 | 6/2014 | Hartley et al. |
| 2014/0205092 A1 | 7/2014 | Hartley et al. |
| 2014/0258188 A1 | 9/2014 | Chen et al. |
| 2014/0358792 A1 | 12/2014 | Berke et al. |
| 2014/0359268 A1 | 12/2014 | Jauhiainen et al. |
| 2014/0359303 A1 | 12/2014 | Berke et al. |
| 2015/0003607 A1 | 1/2015 | Choi et al. |
| 2015/0052351 A1 | 2/2015 | Nodehi Fard Haghighi et al. |
| 2015/0086016 A1 | 3/2015 | Oshida et al. |
| 2015/0113278 A1 | 4/2015 | Cocchi et al. |
| 2015/0134555 A1 | 5/2015 | Fancher et al. |
| 2015/0163211 A1 | 6/2015 | Chellappa et al. |
| 2015/0255052 A1 | 9/2015 | Rex |
| 2015/0294308 A1 | 10/2015 | Pauker et al. |
| 2015/0302409 A1 | 10/2015 | Malek et al. |
| 2015/0317644 A1 | 11/2015 | Chanez et al. |
| 2015/0332283 A1 | 11/2015 | Witchey |
| 2016/0092687 A1 | 3/2016 | Boenisch et al. |
| 2016/0099922 A1 | 4/2016 | Dover |
| 2016/0180343 A1 | 6/2016 | Poon et al. |
| 2016/0283920 A1 | 9/2016 | Fisher et al. |
| 2016/0285636 A1 | 9/2016 | Davoust et al. |
| 2016/0294783 A1 | 10/2016 | Piqueras Jover et al. |
| 2016/0330034 A1 | 11/2016 | Back et al. |
| 2016/0358184 A1 | 12/2016 | Radocchia et al. |
| 2017/0017957 A1 | 1/2017 | Radu |
| 2017/0046516 A1 | 2/2017 | Henry |
| 2017/0046517 A1 | 2/2017 | Henry |
| 2017/0109668 A1 | 4/2017 | Marcu et al. |
| 2017/0109676 A1 | 4/2017 | Marcu et al. |
| 2017/0126414 A1 | 5/2017 | Goel et al. |
| 2017/0163760 A1 | 6/2017 | Wood et al. |
| 2017/0206382 A1 | 7/2017 | Rodriguez De Castro et al. |
| 2017/0221055 A1 | 8/2017 | Carlsson et al. |
| 2017/0228731 A1 | 8/2017 | Sheng et al. |
| 2017/0236121 A1 | 8/2017 | Lyons et al. |
| 2017/0310653 A1 | 10/2017 | Zhang |
| 2017/0331624 A1 | 11/2017 | Samid |
| 2017/0345019 A1 | 11/2017 | Radocchia et al. |
| 2018/0006826 A1 | 1/2018 | Smith et al. |
| 2018/0012311 A1 | 1/2018 | Small et al. |
| 2018/0046956 A1 | 2/2018 | Marcu et al. |
| 2018/0048462 A1 | 2/2018 | Salmela et al. |
| 2018/0054491 A1 | 2/2018 | Mankovskii et al. |
| 2018/0089685 A1 | 3/2018 | Mcgregor et al. |
| 2018/0108024 A1 | 4/2018 | Greco et al. |
| 2018/0131519 A1 | 5/2018 | Le Scouarnec et al. |
| 2018/0136633 A1 | 5/2018 | Small et al. |
| 2018/0137512 A1 | 5/2018 | Georgiadis et al. |
| 2018/0152297 A1 | 5/2018 | Fielding et al. |
| 2018/0184290 A1 | 6/2018 | Luo et al. |
| 2018/0227275 A1 | 8/2018 | Russinovich et al. |
| 2018/0331832 A1 | 11/2018 | Pulsifer |

OTHER PUBLICATIONS

U.S. Appl. No. 15/975,539, filed May 9, 2018, Cryptographic ASIC for Derivative Key Hierarchy.

U.S. Appl. No. 15/975,615, filed May 9, 2018, Cryptographic ASIC for Key Hierarchy Enforcement.

U.S. Appl. No. 15/980,179, filed May 15, 2018, Cryptographic ASIC With Onboard Permanent Context Storage and Exchange.

"U.S. Appl. No. 14/997,113, Examiner Interview Summary dated Dec. 19, 2017", 3 pgs.

"U.S. Appl. No. 14/997,113, Final Office Action dated Apr. 11, 2018", 35 pgs.

(56) References Cited

OTHER PUBLICATIONS

"U.S. Appl. No. 14/997,113, Non Final Office Action dated Oct. 10, 2017", 31 pgs.

"U.S. Appl. No. 14/997,113, Response filed Mar. 12, 2018 to Non Final Office Action dated Oct. 10, 2017", 24 pgs.

"International Application Serial No. PCT/US17/13377, International Search Report dated Apr. 18, 2017", 2 pgs.

"International Application Serial No. PCT/US17/13377, Written Opinion dated Apr. 18, 2017", 7 pgs.

"International Application Serial No. PCT/US2017/013377, International Preliminary Report on Patentability dated Feb. 13, 2018", 8 pgs.

"International Application Serial No. PCT/US2017/013377, Response filed Nov. 13, 2017 to Written Opinion dated Apr. 18, 2017", 4 pgs.

"U.S. Appl. No. 15/975,539, Preliminary Amendment filed Sep. 20, 2018", 17 pgs.

"U.S. Appl. No. 15/980,179, First Action Interview—Pre-Interview Communication dated Sep. 7, 2018", 4 pgs.

"U.S. Appl. No. 15/994,877, First Action Interview—Pre-Interverw Communication dated Sep. 4, 2018", 4 pgs.

"U.S. Appl. No. 15/994,938, First Action Interview—Pre-Interview Communication dated Sep. 14, 2018", 4 pgs.

"U.S. Appl. No. 15/975,615, Non Final Office Action dated Jul. 23, 2018", 12 pgs.

"U.S. Appl. No. 15/975,539, First Action Interview—Pre-Interview Communication dated Aug. 7, 2018", 4 pgs.

"U.S. Appl. No. 14/997,113, Response filed Aug. 10, 2018 to Final Office Action dated Apr. 11, 2018", 22 pgs.

"U.S. Appl. No. 14/997,113, Advisory Action dated Aug. 28, 2018", 5 pgs.

"U.S. Appl. No. 15/975,539, Response filed Sep. 7, 2018 to First Action Interview—Pre-Interview Communication dated Aug. 7, 2018", 17 pgs.

"U.S. Appl. No. 14/997,113, Response filed Oct. 11, 2018 to Final Office Action dated Apr. 11, 2018 and Advisory Action dated Aug. 28, 2018", 24 pgs.

U.S. Appl. No. 15/994,938, Response filed Oct. 14, 2018 to First Action Interview Pre-Interview Communication dated Sep. 14, 2018.

"U.S. Appl. No. 15/975,615, Examiner Interview Summary dated Oct. 23, 2018", 3 pgs.

"U.S. Appl. No. 15/980,179, First Action Interview—Office Action Summary dated Oct. 26, 2018", 3 pgs.

"U.S. Appl. No. 15/994,877, Examiner Interview Summary dated Oct. 23, 2018", 3 pgs.

"U.S. Appl. No. 15/975,539, First Action Interview—Office Action Summary dated Dec. 10, 2018", 4 pgs.

"U.S. Appl. No. 15/975,615, Notice of Allowance dated Dec. 10, 2018", 12 pgs.

"U.S. Appl. No. 15/994,877, Preliminary Amendment filed Nov. 5, 2018", 10 pgs.

"U.S. Appl. No. 15/994,938, Preliminary Amendment filed Nov. 14, 2018", 12 pgs.

\* cited by examiner

CRYPTOGRAPHIC ASIC WITH AUTONOMOUS ONBOARD PERMANENT STORAGE

RELATED APPLICATIONS

This application claims the priority benefit of commonly-assigned provisional application U.S. Ser. No. 62/662,544, filed on Apr. 25, 2018, and entitled "Cryptographic ASIC For Derivative Key Hierarchy", which is hereby incorporated by reference in its entirety. This application is also related by subject matter to commonly-assigned U.S. Ser. No. 14/997,113, filed on Jan. 15, 2016, published on Jul. 20, 2017 as U.S. Patent Application Publication 2017/0206382A1, and entitled "Cryptographic ASIC Including Circuitry-Encoded Transformation Function", which is hereby incorporated by reference in its entirety.

TECHNICAL FIELD

The disclosed technology relates generally to the design of integrated electronic circuits, and more particularly, some embodiments relate to the design of cryptographic integrated circuits.

BACKGROUND

Application-specific integrated circuits (ASICs) are integrated circuits designed and built to serve a particular purpose or application. ASICs provide fast computational speed compared with slower, more generalized solutions, such as software solutions running on general-purpose processors or field programmable gate arrays (FPGAs). As the name implies, ASICs are generally designed to perform only one specific application, resulting in a trade-off between flexibility and computational speed. ASICs are increasing in importance in cryptography-related fields, such as proof-of-work systems, digital rights management systems, and other applications generally having stringent speed and efficiency requirements.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION OF THE EMBODIMENTS

Figure 1:
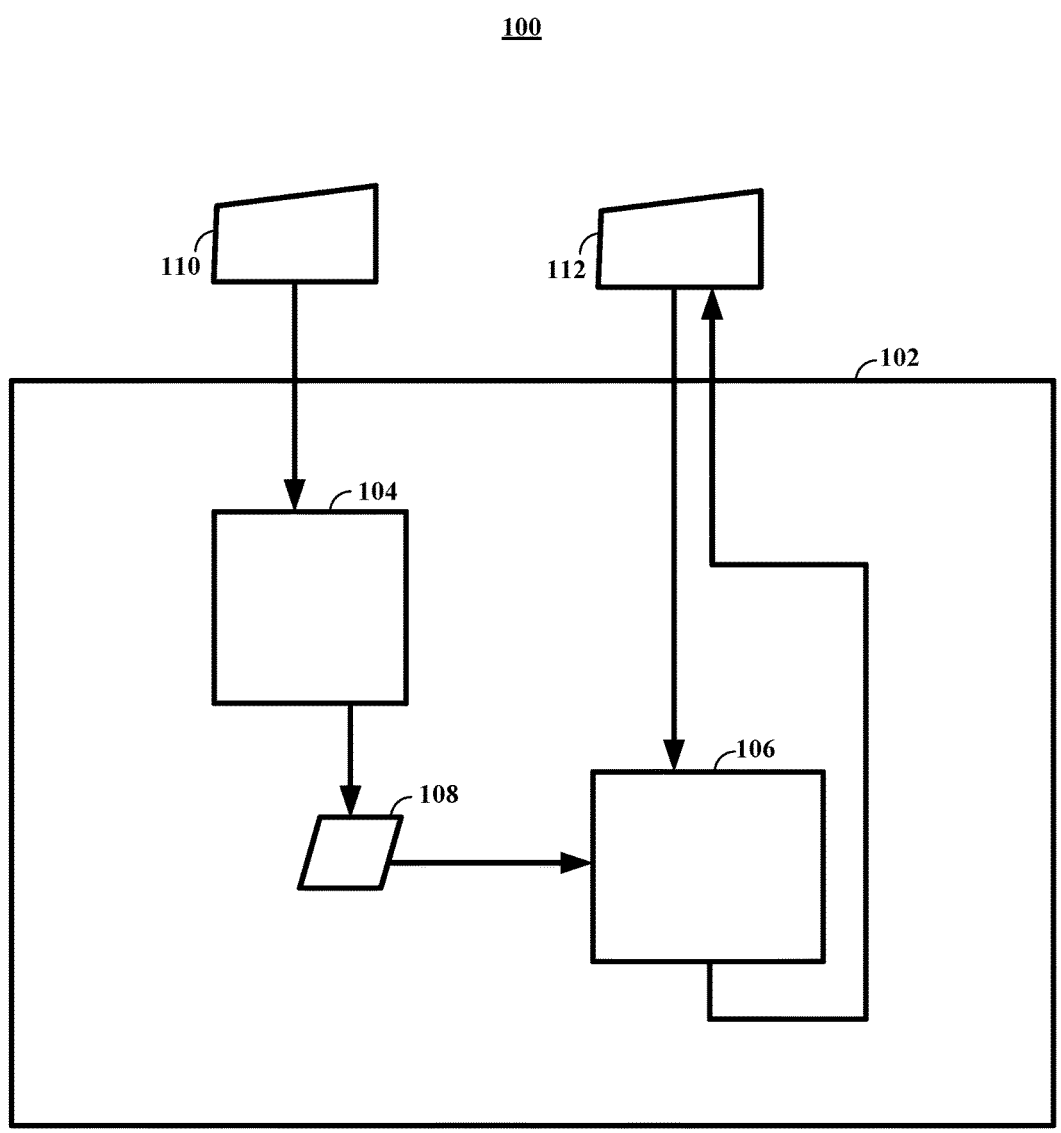
FIG. 1 shows a block diagram of a transform-enabled cryptographic circuit containing a transform enabled hashing core, implemented as a stand-alone integrated circuit, according to an embodiment.

Embodiments of the technology disclosed herein are directed toward the design, fabrication, programming, and utilization of application specific integrated circuits for cryptography-related applications. More particularly, various embodiments of the technology disclosed herein relate to ASICs having one or several programmable transformation functions embodied as circuitry incorporated into the integrated circuit's high speed datapath. By encoding transformation function as datapath circuitry, embodiments of the technology disclosed herein enable ASICs to implement any one of a very broad range of proof-of-work calculations, as selected by the user. The proof-of-work based cryptographic verification processes may include but are not limited to the cryptographic network transaction verification systems often used in the emerging field of blockchain technology.

In an example, a cryptographic integrated circuit for managing operations on an information stream may include a first one-way function (OWF) circuit block that generates a hash of an input message, a programmable transformation function circuit block that is customized by a transform key and transforms the hash into a transformed hash, and a second OWF circuit block that generates a second hash of the transformed hash as an output result. The cryptographic integrated circuit may control an information stream knowledge hierarchy by performing operations enabling a user to identify the information stream, process an input message from the information stream, or create the information stream.

In another example, a cryptographic method for managing operations on an information stream may include processing an input message from the information stream by hashing the input message, performing a customized transforming of the hash, and hashing the transformed hash into an output result, with the transforming customized based on a transform key, and enabling creating the information stream based on a user passphrase from which the transform key is derived.

In another example, a non-transitory computer-readable storage medium may contain instructions which, when executed by a processor, cause a computer to execute cryptographic operations for managing operations on an information stream. The operations may include processing an input message from the information stream by hashing the input message, performing a customized transforming of the hash, and hashing the transformed hash into an output result, with the transforming customized based on a transform key, and enabling creating the information stream based on a user passphrase from which the transform key is derived.

In an example, a cryptographic integrated circuit for managing operations on an information stream may include a transform key generator that derives a transform key from a temporary copy of a user passphrase, and a one-time programmable (OTP) memory that stores the transform key in isolation using programming pulses from external circuitry. The circuit may further include a first one-way function (OWF) circuit block that generates a hash of an input message, a programmable transformation function circuit block that is customized by a transform key and transforms the hash into a transformed hash, and a second OWF circuit block that generates a second hash of the transformed hash as an output result, wherein the operations include identifying the information stream, processing an input message from the information stream into the output result, and/or creating the information stream.

In another example, a cryptographic method for managing operations on an information stream may include deriving a transform key from a temporary copy of a user passphrase, and storing the transform key in a one-time programmable memory in isolation using programming pulses from external circuitry. The method may further include processing an input message from the information stream by hashing the input message, performing a customized transforming of the hash, and hashing the transformed hash into an output result, with the transforming customized based on a transform key, and enabling creating the information stream based on a user passphrase from which the transform key is derived.

In another example, a system for managing operations on an information stream may include means for deriving a transform key from a temporary copy of a user passphrase, and means for storing the transform key in a one-time programmable memory in isolation using programming pulses from external circuitry. The system may further include means for processing an input message from the information stream by hashing the input message, performing a customized transforming of the hash, and hashing the transformed hash into an output result, with the transforming customized based on a transform key, and means for enabling creating the information stream based on a user passphrase from which the transform key is derived.

In an example, a cryptographic integrated circuit for managing operations on an information stream may include a transform key generator that derives a transform key from a temporary copy of a user passphrase, and a one-time programmable memory that stores the transform key in isolation using programming pulses from internal circuitry. The circuit may further include a first one-way function (OWF) circuit block that generates a hash of an input message, a programmable transformation function circuit block that is customized by a transform key and transforms the hash into a transformed hash, and a second OWF circuit block that generates a second hash of the transformed hash as an output result, wherein the operations include identifying the information stream, processing an input message from the information stream into the output result, and/or creating the information stream.

In another example, a cryptographic method for managing operations on an information stream may include deriving a transform key from a temporary copy of a user passphrase, and storing the transform key in a one-time programmable memory in isolation using programming pulses from internal circuitry. The method may further include processing an input message from the information stream by hashing the input message, performing a customized transforming of the hash, and hashing the transformed hash into an output result, with the transforming customized based on a transform key, and enabling creating the information stream based on a user passphrase from which the transform key is derived.

In another example, a system for managing operations on an information stream may include means for deriving a transform key from a temporary copy of a user passphrase, and means for storing the transform key in a one-time programmable memory in isolation using programming pulses from internal circuitry. The system may further include means for processing an input message from the information stream by hashing the input message, performing a customized transforming of the hash, and hashing the transformed hash into an output result, with the transforming customized based on a transform key, and means for enabling creating the information stream based on a user passphrase from which the transform key is derived.

In an example, an integrated circuit for autonomously storing context data may include a one-time programmable memory circuit block programmed by internal programming circuitry to store the context data in isolation, and a secure communications circuit block to control retrieval of the context data.

In another example, a cryptographic method for autonomously storing context data in an integrated circuit may include storing the context data in isolation in a one-time programmable memory circuit block programmed by internal programming circuitry, and controlling retrieval of the context data with a secure communications circuit block.

In another example, a system for autonomously storing context data may include means for storing the context data in isolation in a one-time programmable memory circuit block programmed by internal programming circuitry, and means for controlling retrieval of the context data with a secure communications circuit block.

In an example, a cryptographic integrated circuit for managing operations on an information stream may include a one-time programmable memory configured to store in isolation a unique configuration key defined by a foundry for each instance of the integrated circuit, and a transformed hash generator configured to derive a unique circuit identifier for each instance of the integrated circuit from an interrogation message using the configuration key.

In another example, a cryptographic method for managing operations on an information stream may include storing in isolation in a one-time programmable memory in an integrated circuit a unique configuration key defined by a foundry for each instance of the integrated circuit, and deriving a unique circuit identifier for each instance of the integrated circuit from an interrogation message using the configuration key.

In another example, a system for managing operations on an information stream may include means for storing in isolation in a one-time programmable memory circuit block a unique configuration key defined by a foundry for each instance of an integrated circuit, and means for deriving a unique circuit identifier for each instance of the integrated circuit from an interrogation message using the configuration key.

In an example, a cryptographic integrated circuit for verifying circuit validity for managing operations on an information stream may include a one-time programmable memory configured to store in isolation a unique internal identifier value defined by one of a foundry and a user, for each instance of the integrated circuit, a transformed hash generator configured to calculate the internal identifier value for each instance of the integrated circuit from a predetermined input message, and a comparator that determines circuit validity by matching the stored internal identifier value with the calculated internal identifier value.

In another example, a cryptographic method for verifying circuit validity for managing operations on an information stream may include storing in isolation in a one-time programmable memory in an integrated circuit a unique internal identifier value defined by one of a foundry and a user, for each instance of an integrated circuit, calculating the internal identifier value for each for each instance of the integrated circuit from a predetermined input message, and determining circuit validity by matching the stored internal identifier value with the calculated internal identifier value.

In another example, a system for verifying circuit validity for managing operations on an information stream may include means for storing in isolation in a one-time programmable memory in an integrated circuit a unique internal identifier value defined by one of a foundry and a user, for each instance of an integrated circuit, means for calculating the internal identifier value for each for each instance of the integrated circuit from a predetermined input message, and means for determining circuit validity by matching the stored internal identifier value with the calculated internal identifier value.

FIG. 1 shows a block diagram of a transform-enabled cryptographic circuit 100 containing a transform enabled hashing core, implemented as a stand-alone integrated circuit, according to an embodiment. This circuit and variations are described in more detail in the patent application incorporated by reference above, but a summary description is provided here.

The transform-enabled cryptographic circuit 100 includes an integrated circuit 102 containing a programming and configuration interface 104, a transform-enabled hashing core 106, and a configuration key 108. Configuration key 108 may be composed of a string of binary digits, and may also be referred to as a transform key or transformation key. In some embodiments, a transform key may be derived from the configuration key 108.

Two exemplary users 110 and 112 may access the integrated circuit 102, with a first user 110 accessing the programming and configuration interface 104, and a second user 112 accessing the transform-enabled hashing core 106. The second user 112 may use a hashing core user interface (not shown). In various embodiments, some or all of the functions of the configuration and programming interface 104 and the hashing core user interface may be combined into a single configuration, programming, and hashing core user interface, while in other embodiments such functions may be divided among more than two interfaces.

The general mode of operation is that the first user 110 may use the programming and configuration interface 104 to both configure various parameters of the operation of the integrated circuit 102 and to program one or more configuration keys 108 into the programmable transformation function or functions in the transform-enabled hashing core 106, where they may be implemented as datapath circuitry. Note that configuration keys 108 are not conventional cryptographic keys in the strictest sense, but instead are customized descriptions of how a selected transformation function is to be activated, such as to transform original input data into transformed input data.

The second user 112 may simply enter an input value or transaction or message that is directly communicated to the transform-enabled hashing core 106 that will calculate and output the corresponding hash value. For a given input message and configuration key 104, any user of an instance of transform-enabled cryptographic circuit 100 should be able to calculate the same corresponding hash value. The input message may comprise a transaction block header from a blockchain for example, which may be subjected to further operations. Note that processing the input message to produce a corresponding hash value may be carried out by the second user without requiring knowledge of the configuration key or keys programmed into the programmable transform-enabled hashing core 106.

Due to the interaction thus established between the programmatic transformation and certain mathematical properties of the cryptographic algorithms involved (particularly, as noted earlier, their nature as OWFs that are easy to perform but hard to revert), the combined effect is to produce a systemic transformation of the bits contained in the final value calculated by the circuit. The transformation is not easily deciphered, not easily distinguishable from noise, and not easily replicable by a party lacking full prior knowledge of the key or keys programmed into the transformation function. Yet the transformation is fully consistent and easily replicable, and thus verifiable, by a party with prior knowledge of the keys or access to the means to utilize them in calculation even while lacking knowledge of them (for example, a party in possession of a previously-programmed ASIC that embodies said keys within its datapath circuitry).

In some embodiments, each user may be a person, while in other embodiments each user may be an automated process such as wallet software, mining software or other kinds of automated processes. In certain embodiments the second user 112 may also have access to the configuration of the various operating aspects of the integrated circuit 102 as described above. In certain embodiments there may be a single interface for the configuration of the various operating aspects of the integrated circuit 102 as a whole, with the programming of keys and the obtaining of final transform-enabled hash values calculated on the basis of data supplied by a user. In other embodiments some or all of those functions may be separate. In certain embodiments, the integrated circuit 102 may be part of a larger computing system, such as a mining system, a hardware wallet, a secure token or dongle, or others. In some embodiments, various implementations of the integrated circuit 102 may be part of a system incorporating one or more of such integrated circuits containing other implementations of the technology described herein.

In some embodiments, various implementations of the integrated circuit 102 may be physically integrated into the same semiconductor material, such as silicon, as other embodiments of the technology described herein. In some such embodiments, the integrated circuit 102 may additionally be further connected to other embodiments of the technology described herein. For example, in various cases the integrated circuit 102 may have a shared access to programmable transformation function or functions in the transform-enabled hashing core 106 as other circuits within the same integrated circuit 102. In various other embodiments, the transform-enabled cryptographic circuit 100 may be physically integrated into the same semiconductor material as another integrated circuit carrying out a different task, such as a microprocessor, a network processor, a system-on-a-chip, and others. In certain embodiments, the transform-enabled hashing core 106 may be embody the configuration key 108 as circuitry by means of one-time programmable circuit elements such as micro-fuses, while in certain embodiments re-writeable circuit elements, such as non-volatile random access memory (RAM) may be used, and in other embodiments other methods may be used.

Figure 2:
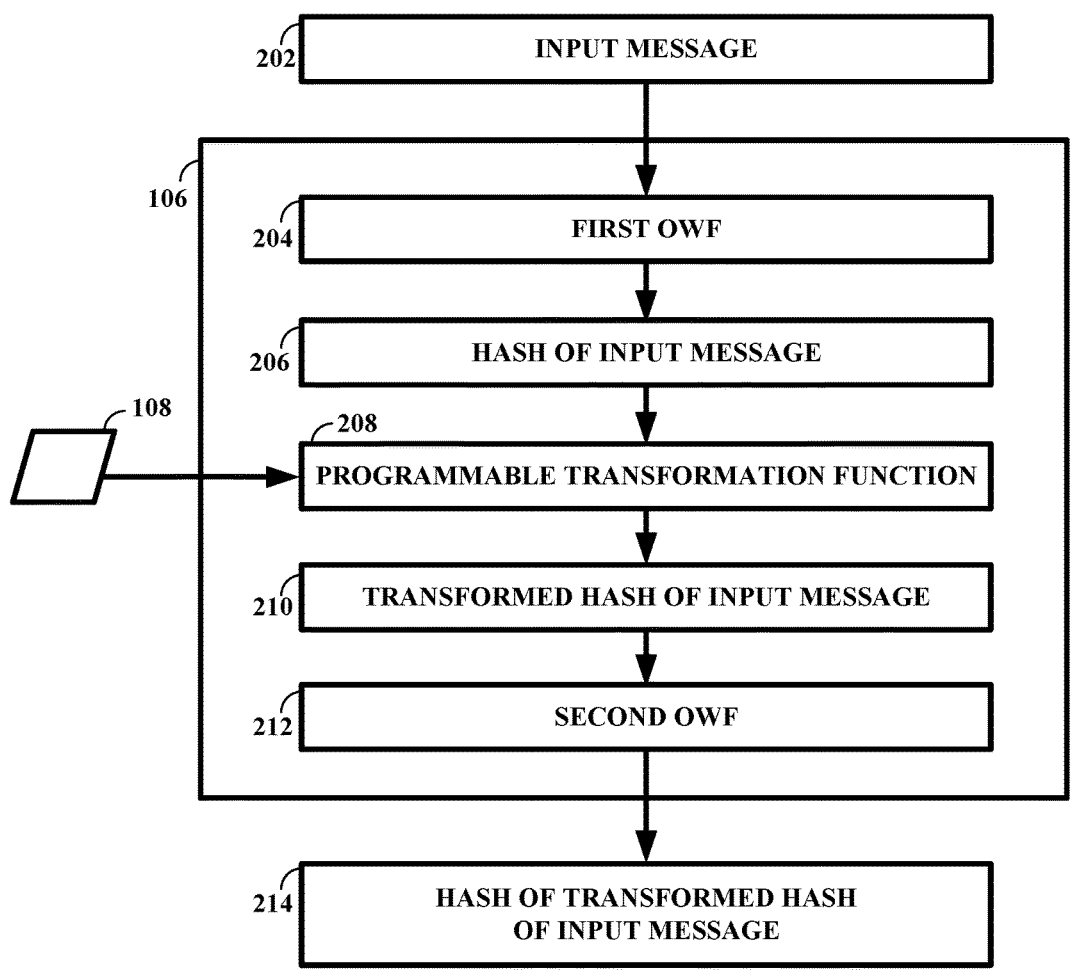
FIG. 2 shows a block diagram of the transform-enabled hashing core, according to an embodiment.

FIG. 2 shows a block diagram of the transform-enabled hashing core 106, according to an embodiment. This diagram depicts the operations performed for the second user 112 in the obtaining of final transform-enabled hash values. An input message 202 or transaction may be provided to the transform-enabled hashing core 106 and passed through a first one-way function (OWF) implementation or hashing block 204. The input message 202 may for example be a candidate transaction block header, such as from a blockchain.

In general, a hashing block may be configured as a set of circuitry that executes the mathematical operations defined by the applicable hashing algorithm. One widely used hashing algorithm is the Secure Hashing Algorithm (SHA), the second version of which is now used as a standard hashing algorithm, often for input messages of 256 bits in length (referred to herein as SHA-256). However, this disclosure is not limited in that regard, as any OWF may be used.

The output of the first hashing block 204 is a hash 206 of the input message 202. A hash, sometimes known as a message digest, may be used as a type of cryptographic description of original message content. Hashes are convenient for various cryptographic purposes as they may be easily computed from an input message, but are computationally difficult to invert for determination of the original input message. Hashing algorithms are sometimes referred to as trapdoor functions for this reason.

The hash 206 may then be processed by an adjustable or customizably programmable transformation function 208, which may also be implemented in circuitry as a transform block. Once programmed, the circuitry within the transform block may effect a specific programmatic transformation upon the data provided to it, reflecting the configuration key 108 provided to it. Thus, and regardless of the content of the data received by the transform block, the transformation the circuitry applies will directly and consistently affect the final value calculated by circuitry further along the datapath.

The programmable transformation function 208 may generate a transformed hash 210 of the input message 202. The transformation function may be very simple, such as a inversion of bits in one embodiment, or the transposition or swapping of bits in another embodiment, or combinations thereof. The programming of a transformation function therefore may customize the treatment to which data fed into the transformation function is subjected. The configuration key 108 may control the specific programming of the programmable transformation function 208. For example, the configuration key 108 may simply be a string of binary digits denoting which corresponding bits of input data are to be inverted, transposed, or both, by the programmable transformation function 208, according to various embodiments. That is, in one embodiment each particular bit of the configuration key 108 may determine whether each corresponding particular bit of input data is passed through directly without transformation, or is transformed.

The transformed hash 210 of the original input message 202 may then be processed by a second OWF implementation or hashing block 212. In some embodiments, the second hashing block 212 may implement the same cryptographic operation as the first hashing block 204. In other embodiments, the second hashing block 212 may implement a different cryptographic operation than the first hashing block 204.

Each OWF implementation protects the data provided to it, through its non-invertible nature. Conceptually, the input data submitted to an OWF is kept within a cryptographic "shadow" that prevents its discovery from the results of the hashing, through computational infeasibility. A party may thus look "downstream" and see the results of a hash operation that is applied to an input, but cannot feasibly look "upstream" and see the original input provided to the hash operation. The output 214 of the transform-enabled hashing core 106 is thus a hash of a transformed hash of the original input message 202.

Knowledge of the user passphrase 302 and of the calculation process whereby the transform key 306 is calculated based on the user passphrase 302 enables the easy calculation of the transform key 306. However, knowledge of the transform key 306 and of the process by which it is calculated on the basis of the user passphrase 302 does not enable easy calculation of the user passphrase 302. Thus, in such embodiments, knowledge of the user passphrase 302 implies knowledge of the transform key 306, but knowledge of the transform key 306 does not imply knowledge of the user passphrase 302. Knowledge of the user passphrase 302 is required to configure the transformation function 208 and thus the integrated circuit 102 to perform in the specific manner that is described by user passphrase 302.

To summarize, the original input message 202 or transaction may be protected by the first OWF 204, transformed by the custom-programmed transformation function 208 per the configuration key 108, and the hashed transformed original input message 210 and the customization of the transform function 208 may be effectively protected again by the second OWF 212.

The present inventor has realized, among other things, that secure programming of the transform-enabled cryptographic circuit 100 enables a variety of advantages. For example, a novel information hierarchy may be defined and cryptographically secured via a transform-enabled cryptographic circuit 100 that stores configuration data without providing external visibility or accessibility to that data. The information hierarchy may enable a cryptographic management methodology that enables the creation of, provides for useful processing of, and allows the simple identification of an information stream to be processed. The information stream may comprise a blockchain, for example.

Certain embodiments of the technology disclosed herein allow a user to enable third parties to easily verify the proofs-of-work produced by transform-enabled integrated circuits by providing the third parties with knowledge of the transform key and thus enabling them to verify such proofs of work by means of (for example and without limitation) software running on general-purpose microprocessors, FPGAs programmed for this purpose, or other means. But knowledge of the transform key does not enable the third parties to program additional copies of the integrated circuit to calculate transform-modified proofs-of-work in the same manner as they are calculated by instances of the integrated circuit that have been programmed using the user passphrase. The circuit described has been designed to perform such validations while not revealing information about the precise mathematical operations involved in the production of the transformed hash values verified.

Further, the system described is also applicable to fields other than the field of blockchain technology. In such other fields, the system may be used for the creation of other secure hardware-based products.

Figure 3:
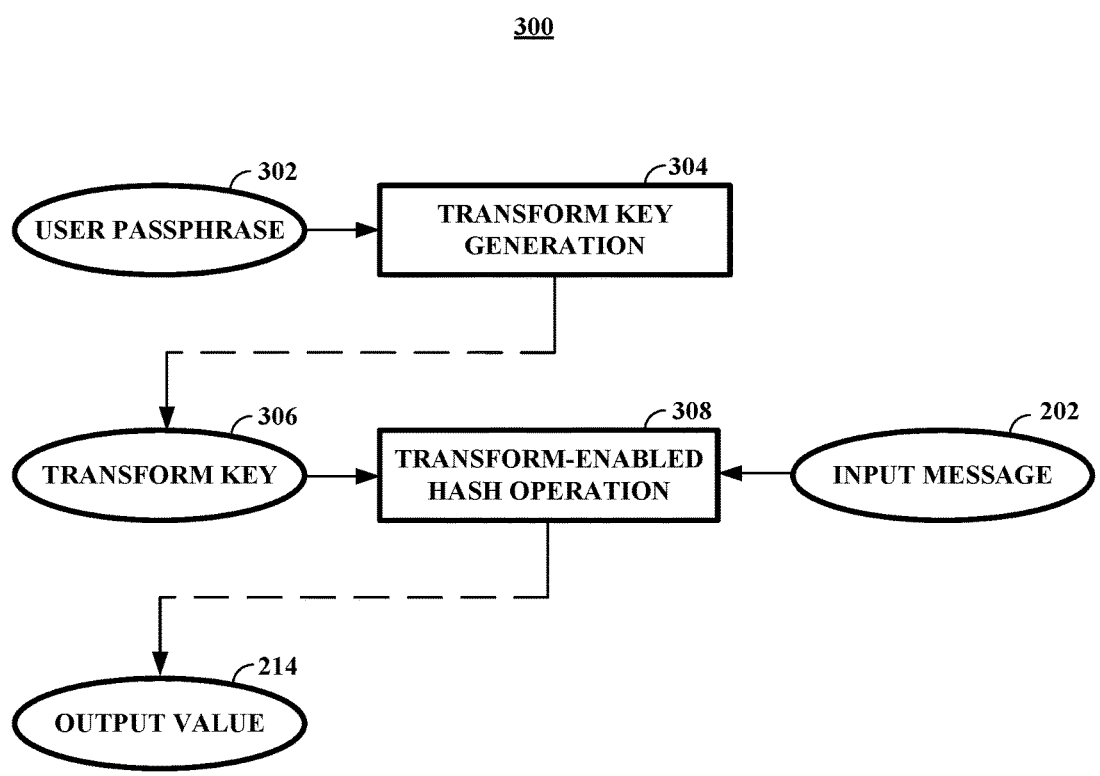
FIG. 3 shows a block diagram of an information hierarchy, according to an embodiment.

FIG. 3 shows a block diagram of an information hierarchy 300, according to an embodiment. At the highest level of the information hierarchy 300, a programming user may provide a user passphrase 302 that controls all aspects of the information stream management methodology. This user may comprise the first user 110 of FIG. 1 for example, who may provide the user passphrase 302 via the programming and configuration interface 104 in one embodiment. The user passphrase 302 may be provided during the manufacture of transform-enabled cryptographic circuit 100, or thereafter.

The user passphrase 302 may comprise a string of binary numbers, or a string of text that may be more easily remembered by a human user but still readily converted into a string of binary numbers. The secrecy of the user passphrase 302 may prevent any other parties from enabling the creation of the information stream being managed. The user passphrase 302 may also enable control of all other operations performed in the information hierarchy 300, e.g., processing of the information stream, and identification of the information stream.

The transform-enabled cryptographic circuit 100 may receive the user passphrase 302 and perform on-chip transform key generation processing 304 to produce a transform key 306. In one embodiment, the transform key 306 is the same as configuration key 108, although embodiments in which the transform key 306 is derived from the configuration key 108 are also encompassed by this disclosure. The on-chip transform key generation 304 processing, rather than a separate off-chip implementation, may enhance security, as will be described.

The transform key generation 304 processing may comprise at least one application of an OWF to the user passphrase 302. In one embodiment, the transform key generation 304 processing comprises two sequential applications of a one way function to the user passphrase 302. The transform key generation 304 processing may for example comprise two sequential applications of SHA-256 to the user passphrase 302, although this disclosure is not limited in that regard.

Use of an OWF may render derivation of the user passphrase 302 from the transform key 306 computationally infeasible. That is, the user passphrase 302 is upstream of the OWF and is therefore cryptographically secure. FIG. 3 thus denotes the transform key 306 as proceeding only downward through a trapdoor function via a dashed line.

The transform key 306 may enable customized processing of the information stream via the transform-enabled hash operation 308, described previously in FIG. 2, and which may be carried out by the transform-enabled hashing core 106 of FIG. 1. Thus, other users, such as the second user 112, may process input messages into transformed hashes as previously described if they know the transform key 306 or have an instance of the transform-enabled cryptographic circuit 100 that internally stores the transform key 306 without providing external access or visibility. However, knowledge of the transform key 306 alone does not enable the ownership, e.g., creation or replication, of an information stream, as that requires the user passphrase 302. FIG. 3 thus denotes the output value 214 as proceeding only downward through a trapdoor function via a dashed line.

In one embodiment therefore, the user passphrase 302 enables creation of a blockchain, while the transform key 306 enables others who do not know the user passphrase 302 to nevertheless process and verify input messages 202 such as blockchain headers. Further, knowledge of the transform key 306 enables the creation of any number of transform-enabled cryptographic circuits 100 for processing input messages 202, if the formulation of the programmable transformation function 208 is known.

The formulation of the programmable transformation function 208 may be published in many cases, or it may be kept obscured. The cryptographic strength of the embodiments does not rely on the secrecy of the programmable transformation function 208. The transform key 306 that controls the customization of the programmable transformation function 208 may also either be kept secret or made public. However this choice depends on whether the second users 112 are intended to be able to process the information stream with only original programmed circuitry, or also with replicated or "cloned" circuitry. For example, in some cases only members of a given group, such as a government or corporation or other set of the second users 112, are intended to have the capability to process a private information stream, so the transform key 306 may be a secret shared only with such intended parties. In other cases, the intent may be for anyone to be able to process a public information stream without the requirement for a shared secret, so the transform key 306 may be made public.

The transform-enabled cryptographic circuit 100 that has been programmed to contain the transform key 306 may determine a specific predetermined output value 214 by processing a specific predetermined test input message 202. The specific predetermined test input message 202 may for example be a widely known or standardized string of given length. In various embodiments, the specific predetermined input message may be all zeroes, or all ones, or a particular string of text that is easily remembered by a human user and readily converted to a string of binary numbers for example.

The specific predetermined output value 214 may be a unique identifier of a given information stream from which input messages 202 originate. A second user 112 who possesses neither knowledge of the user passphrase 302 nor of the transform key 306 may therefore nonetheless identify a given information stream using an instance of the programmed transform-enabled cryptographic circuit 100. Such a second user 112 may process messages, but cannot make copies of the transform-enabled cryptographic circuit 100 that has been programmed to inaccessibly and invisibly contain the transform key 306. This ability to identify an information stream with no direct knowledge of the user passphrase 302 nor of the transform key 306 may be particularly advantageous in certain use scenarios.

For example, in one embodiment the information stream is a blockchain, and the predetermined output value 214 is a ChainID that uniquely identifies the blockchain. In the future, there may be a large number of different blockchains, so through a ChainID any second user 112 with a programmed transform-enabled cryptographic circuit 100 may distinguish the blockchain from which input messages 202 originate from all others.

The ChainID is thus the lowest derivation level of the information hierarchy 300. The ChainID does not enable the creation of a blockchain (that requires knowledge of the user passphrase 302), and does not by itself enable the ability to replicate the programmed transform-enabled cryptographic circuit 100 (that requires knowledge of the transform key 306 by the second user 112 which may not be accessible or visible from the programmed transform-enabled cryptographic circuit 100). The ChainID functionality does however enable the easy identification of the blockchain.

Thus, the information hierarchy 300 can separate out the ability to create a blockchain, interact with it, and identify it.

Someone who knows only the transform key 306 but not the user passphrase 302 cannot create a blockchain for example, but can identify and verify it. Such verification may be the basis of a proof-of-work system, e.g. bitcoin mining, although this disclosure is not limited in that regard.

Figure 4:
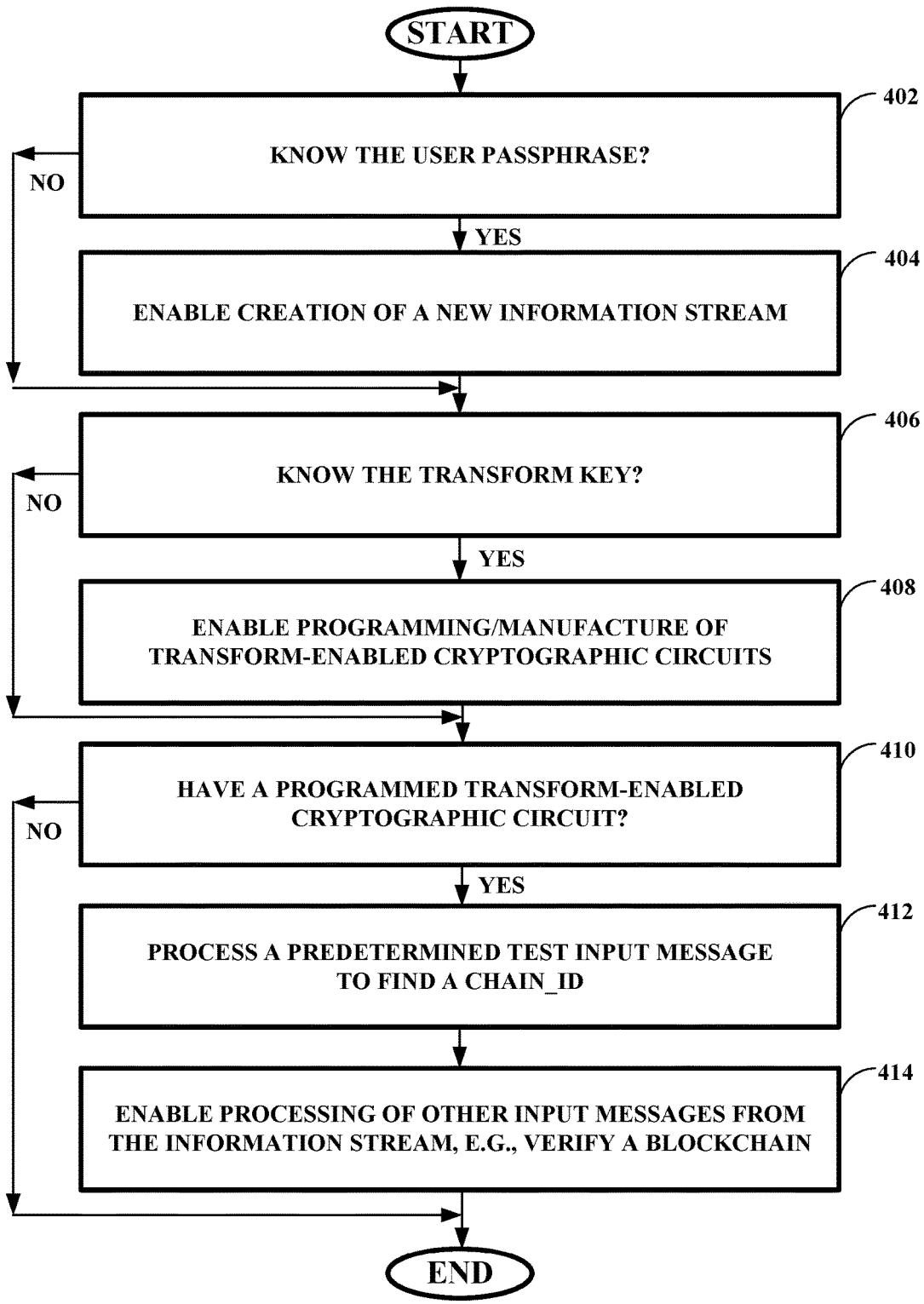
FIG. 4 shows a flowchart of the management methodology of the information hierarchy, according to an embodiment.

FIG. 4 shows a flowchart of the management methodology 400 of the information hierarchy, according to an embodiment. The methodology 400 is shown arranged from the most restrictive to the least restrictive controlled operations described above.

At 402, the methodology 400 may initially determine if a user knows the user passphrase 302. If so, at 404 the user may be granted full control over the information hierarchy 300, and is thus equivalent to the first user 110 as previously described. Such a user may be provided with the ability to create a new unique information stream, such as a blockchain for example. The user may proceed to create an information stream by customizing the programming of a transformation function and using the transform-enabled cryptographic circuit 100 to create blockchain block headers for example. The headers may include a field indicating the particular validation method to be used for corresponding message content.

If the user does not know the user passphrase 302, the methodology 400 may proceed to 406. At 406, the methodology may determine if the user knows the transform key 306. If so, the user may, at 408, be granted the further privilege of programming additional instances or copies of transform-enabled cryptographic circuits 100. The programming may occur during a manufacturing process or thereafter.

If the user does not know the transform key 306, the methodology 400 may proceed to 410. At 410, the methodology 400 may determine if the user at least has a programmed transform-enabled cryptographic circuit 100 to process an information stream that has been created in view of the technology described in this disclosure. If so, then at 412, the methodology 400 may process a predetermined test input message 202 to produce a predetermined output value 214 that serves as a ChainID. The ChainID may indicate a particular information stream, such as a blockchain, from which input messages originate. This operation is optional.

At 414, the methodology 400 may enable the processing of other input messages from the information stream. In one embodiment, the information stream is a blockchain, and the processing comprises verification of the blockchain through computation of transform-customized hashes for subsequent comparison. If the user does not have a programmed transform-enabled cryptographic circuit 100, then an information stream that has been created in view of the technology described in this disclosure cannot be processed nor identified by the user.

The present inventor has realized, among other things, that particular circuitry may advantageously secure the programming of the transform-enabled cryptographic circuit 100. Such particular circuitry may enable the first user 110 to provide to the transform-enabled cryptographic circuit 100 with a copy of the user passphrase 302 which is used to generate the unique configuration key 108 for the cryptographic circuit 100. Similarly, the circuitry may enable the derivation of the transform key 306 from the configuration key 108 in those cases where the transform key 306 is not the same as the configuration key 108.

In either case, storage of the transform key 306 in the circuitry in isolation, e.g., in a manner that is neither accessible nor visible externally, serves to enable enforcement of part of the information hierarchy 300 previously described. That is, if the first user 110 has knowledge of the transform key 306 during or after its generation, that user may replicate circuitry (or executable instructions) that implements the particular customized transform-enabled hashing used to process input messages 202. In contrast, if the second user 112 does not have knowledge of the transform key 306 but simply has access to circuitry that invisibly stores the transform key 306 in isolation, such second user 112 may process input messages but may not replicate the circuitry. That is, the invisible, inaccessible, and indelible isolated storage of the transform key 306 prevents the circuitry from being "cloned". The processing of input messages 202 may include identifying a given information stream and verifying messages from the information stream for example, as previously described, whether by circuitry or executable instructions.

Hardware based enforcement of the management of the information hierarchy 300 may not only enable different users to be granted different levels of control of the information hierarchy 300, it may also limit the availability of the transform key 306. For example, if the first user 110 who has the user passphrase 302 wants to generate a transform key 306, that does not necessarily mean that the first user 110 wants to have actual knowledge of the transform key 306, or even knowledge of how the transform key 306 is derived from the user passphrase 302. The first user 110 may not want to be capable of determining the transform key 306 at all.

Instead, the first user 110 may simply wish to create hardware that only generates and securely stores the transform key 306 internally, that is, in isolation, to enable input message processing and information stream identification by for example second users 112. The particular methodology for generating the transform key 306 from the user passphrase 302 thus may not need to be known even to the first user 110 who has control of the entire information hierarchy 300.

Similarly, particular circuitry may better protect the user passphrase 302 that enables complete control of the entire information hierarchy 300. That is, the first user 110 may provide the user passphrase 302 to the transform-enabled cryptographic circuit 100, but that circuit 100 may delete the user passphrase 302 as soon as derivation of the configuration key 108 and/or transform key 306 has been completed and the key value or values are indelibly and inaccessibly stored within the circuit 100.

The patent application previously incorporated by reference provides further detail on the various one-time programmable memory technologies that may store information in circuitry. These technologies may include but are not limited to for example micro-fuses, anti-fuses, non-volatile random access memories including but not limited to flash memory or other types of non-volatile memory. In general, determination of the state of each element of such memories via external physical examination is intentionally very difficult or infeasible.

Software based implementations of the transform-customized message hashing process previously described are also within the scope of this disclosure. However, hardware based implementations may be more immune to monitoring during operation. The undesirable consequences of such monitoring could include for example the eventual discovery of the user passphrase 302, the transform key 306, as well as the transform key generation 304 methodology.

Hardware implementations may therefore offer better enforcement of the restricted creation of information streams, such as blockchains, based on the secrecy of the user passphrase 302. Hardware implementations may also offer better enforcement of the restricted ability to replicate transform-customized hashing circuitry, based on the availability of the transform key 306. This disclosure therefore provides a novel self-contained internally-programming circuit approach to hardware-based enforcement of the information hierarchy 300.

Figure 5:
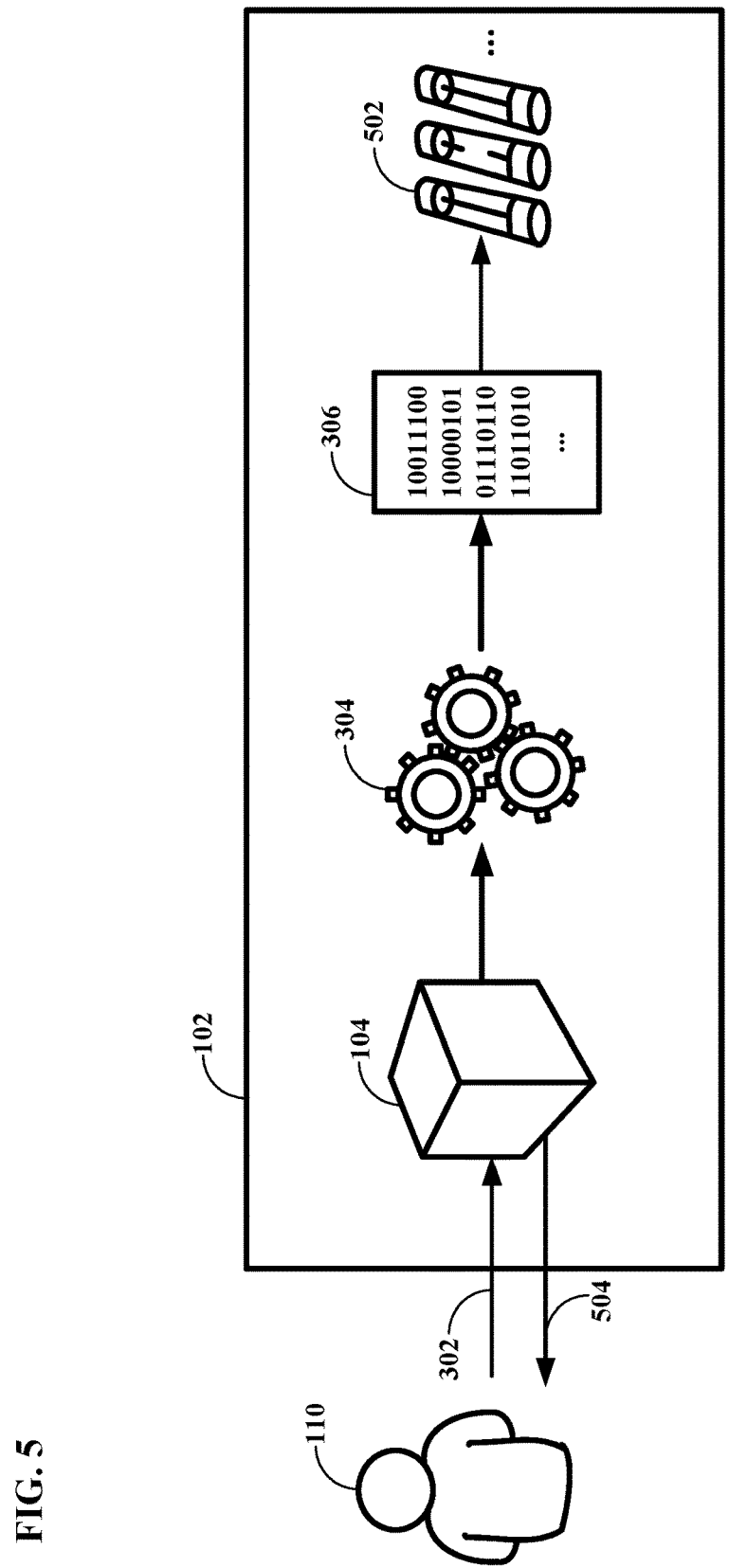
FIG. 5 shows a functional diagram of an internally-programming integrated circuit, according to an embodiment.

FIG. 5 shows a functional diagram of an internally-programming integrated circuit 102, according to an embodiment. The integrated circuit 102 acts as a conceptual "shopkeeper" that receives instructions from a customer (e.g., the first user 110) at the front counter of a shop, and then performs various tasks the customer requires, but does so "behind the scenes" or out of view of the customer, in isolation.

In this case, the integrated circuit 102 may receive a copy of the user passphrase 302 from the first user 110 via the programming and configuration interface 104 previously described. The programming and configuration interface 104 may act as a "black box" that accepts certain inputs, but only outputs acknowledgements and does not echo the inputs provided. That is, the programming and configuration interface 104 does not allow access to or visibility of the isolated internal operations of the integrated circuit 102.

The integrated circuit 102 may then generate the transform key 306 according to a transform key generation 304 methodology embedded in its circuitry. The first user 110 may be aware of the transform key generation 304 methodology in some embodiments, or the first user 110 may not be aware of the transform key generation 304 methodology in other embodiments. Note that transform key 306 may be the same as the configuration key 108 or may be derived from the configuration key 108 as previously described.

The integrated circuit 102 may then store the generated transform key 306 in an indelible and hidden manner, and delete its copy of the user passphrase 302. In one embodiment, the transform key 306 is stored in a one-time programmable memory 502, which may comprise an array of micro-fuses or anti-fuses or various types of non-volatile memory. Micro-fuses are generally short circuits until they are effectively "blown" open (e.g., rendered non-conductive), typically by application of a voltage pulse of particular magnitude and duration. Anti-fuses in contrast are generally open circuits until they are effectively "burned" closed (e.g., rendered conductive), typically again by application of a voltage pulse of particular magnitude and duration. These state changes may not result in physical changes that are readily visible.

The integrated circuit 102 may provide an acknowledgement 504 to the first user 110 to for example denote at least one of the receipt of the user passphrase 302, the deletion of the user passphrase 302, and the successful completion of the storage of the transform key 306 into memory 502. Thus, the conceptual shopkeeper effectively provides the internally-programmed integrated circuit 102 to the customer (e.g., the first user 110) after having customized it in isolation, e.g., without any customer access or visibility into the programming process.

The approach provided offers the first user 110 the advantage of trusting the hardware implementation with the user passphrase 302 for only a limited time, because the hardware implementation will not store the user passphrase 302 once the transform key 306 has been generated and stored internally. Further, the first user 110 knows that the hardware implementation is relatively secure from attack. That is, a hacker may be able to dismantle the integrated circuit 120 to attempt to determine the transform key generation methodology and the programmable transformation function, but the security of the system does not depend on knowledge of either.

Recovery of the actual transform key 306 (which was generated from the now-deleted user passphrase 302 and stored in the one-time programmable memory 502), which is required for cloning of the integrated circuit 102, is generally infeasible via physical examination. Further, a hacker may have to destroy a new copy of the programmed integrated circuit 102 with every hacking attempt, which would rapidly become expensive.

With current semiconductor fabrication processes, the incorporation of flash memory onto the same integrated circuit as logic circuitry is not presently available for processes that produce logic devices of less than 28 nm feature size. Use of micro-fuses or anti-fuses therefore may be advantageous, as they do not suffer from this process limitation. Both micro-fuses and anti-fuses may be placed in the datapath circuitry within the integrated circuit in such a manner as to result in a very limited performance overhead, thus retaining the advantages ASICs have over other types of solutions in terms of speed and efficiency.

The programming of the one-time programmable memory 502 may be performed during the manufacture of the integrated circuit 102, or may be performed subsequently, according to various embodiments. This feature enables the manufacture of "blank" or uncustomized integrated circuits 102 that may programmed by the first user 110 without requiring any trust of the manufacturer. External circuitry (which is not integrated with the integrated circuit 102) may be designed to generate and apply a programming voltage pulse of predetermined magnitude and duration to store data into an element of memory 502. In some cases such programming voltages are higher than logic power supply voltages, so in some embodiments external circuitry may generate such voltages, and apply them when triggered to do so by the integrated circuit 102.

The integrated circuit 102 may for example step through an indexed array of elements in the memory 502 to be programmed. The integrated circuit 102 may signal the external circuitry when a targeted memory element has been electrically connected to an external pin that receives programming voltage pulses from outside the integrated circuit 102. Thus, even during programming, the transfer key 306 is not externally visible; only a set of internally-triggered externally-generated programming pulses may be observed in such embodiments. Further, the timing of such trigger signals may be varied to obscure such observations. Similarly, voltage pulses that do not actually program any memory elements may be triggered to further obscure the programming process.

Figure 6:
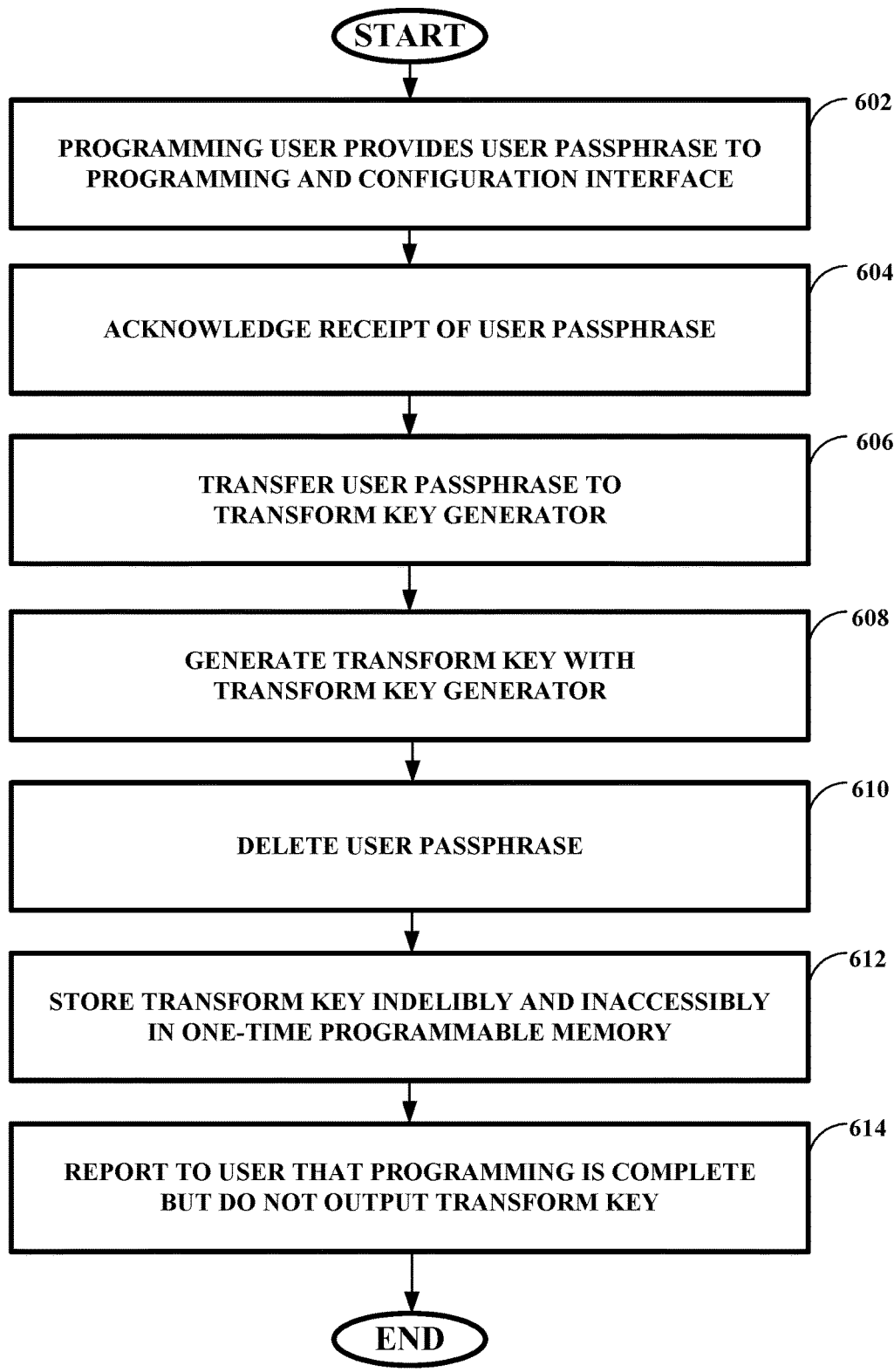
FIG. 6 shows a flowchart of a customized equipment programming process for information stream management, according to an embodiment.

FIG. 6 shows a flowchart of a customized equipment programming process 600 for information stream management, according to an embodiment. At 602, the process may begin when a programming user (e.g., the first user 110) provides a copy of the user passphrase 302 to the programming and configuration interface 104. The programming and configuration interface 104 may provide an acknowledgement that it has received the user passphrase 302, but does not echo back a copy of it.

At 604, the process may acknowledge receipt of the user passphrase. At 606, the process may transfer the copy of the user passphrase 302 to the transform key generator 304. At 608, the process may generate the transform key 306 with the transform key generator 304. In some embodiments, the transform key generator 304 generates the transform key 306 by applying a number of hashing operations (e.g., two applications of the SHA-256 hashing function) sequentially to the user passphrase 302, but this disclosure is not limited in that regard. In some embodiments, the configuration key 108 is derived from the user passphrase 302, and the transform key 306 is derived from the configuration key 108, but this disclosure is again not limited in that regard.

At 610, the process may delete the copy of the user passphrase 302. This ensures that the user passphrase 302 cannot be recovered by a hacker who may dismantle equipment that enforces the information stream management constraints. The deletion may be acknowledged by the programming and configuration interface 104.

At 612, the process may store the transform key 306 indelibly and inaccessibly into one-time programmable memory 502. Maintenance of the secrecy of the transform key 306 may prevent replication of the equipment that enforces the information stream management constraints. At 614, the programming and configuration interface 104 may provide an acknowledgement to the programming user 110 that the customized programming process has been successfully completed.

The present inventor has realized, among other things, that the particular circuitry that may advantageously secure the transform programming of the transform-enabled cryptographic circuit 100 in isolation may be improved. Rather than requiring external circuitry to provide programming pulses for changing states in elements of the one-time programmable memory 502, in some embodiments an ASIC may instead handle all of the memory 502 programming tasks by itself. That is, all of the permanent on-chip storage tasks related to keeping the transform key 306 hidden in the memory 502 may be performed by the same integrated circuit 102 that performs the various cryptographic functions previously described.

In an embodiment, an autonomous self-programming integrated circuit 102 may have its own internal circuitry for permanently recording states into permanent on-chip storage. For example, internal voltage-boosting charge pump circuitry may be integrated together with the logic circuitry on the same semiconductor chip to generate the voltages required to change memory 502 element states. Internal timer circuitry may also be integrated on the same semiconductor chip, to apply the boosted voltages to selected memory 502 elements for a predetermined specified time. Applicable voltage-boosting and timer circuitry is familiar to one of ordinary skill in the art.

Such an integrated circuit 102 alone may fully implement the conceptual "shopkeeper" previously described, who accepts only a user passphrase from a programming user (e.g., the first user 110). This embodiment provides several advantages over the embodiments previously described.

First, there would be no need to coordinate operations between the self-programming integrated circuit 102 and any external (not commonly-integrated) circuitry used for memory management. Specifically, there would be no need to provide an external pin that would receive the programming voltage pulses from any external circuitry outside the integrated circuit 102, nor an external pin to provide trigger signals to any external circuitry. Pin count for the integrated circuit 102 may therefore be reduced, reducing circuit cost and complexity.

Second, the details of the programming voltage pulse magnitude and duration need not be made public with this embodiment. Such details may allow a hacker to infer what type of one-time programmable memory 502 elements are used in the integrated circuit 102 if publicized. That information could be useful in aiding a hacking attempt. Therefore, the autonomous self-programming integrated circuit 102 described herein may be more secure than other programmable integrated circuits.

Finally, since no external circuitry is required for memory programming in this embodiment, overall system reliability may be increased as there is less possibility that the integrated circuit 102 could be damaged during its programming. This aspect may be particularly advantageous for embodiments in which the integrated circuit 102 is not programmed during manufacture but is instead programmed later, perhaps in a less well controlled environment.

In cases where a user, versus a manufacturer or vendor, performs the programming of one-time programmable memory 502 elements, circuit failures that may actually be due to the user may instead be blamed on the manufacturer or vendor. In such cases the user may return the integrated circuit 102 for a refund, falsely asserting that it was defective on arrival. The processing of such product returns may constitute a significant expense and may unnecessarily put the reputation of a manufacturer or vendor at risk. The use of autonomous self-programming may bypass this issue entirely.

The present inventor has realized, among other things, that the particular circuitry that may autonomously secure the transform programming of the transform-enabled cryptographic circuit 100 in isolation may prove advantageous in a variety of different use scenarios. For example, in one embodiment, an autonomous self-programming integrated circuit 102 may permanently record into the one-time programmable memory 502 a variety of data regarding its history after manufacture. The integrated circuit 102 may record instances in which excessive voltages were applied to one or more of its pins.

The integrated circuit 102 may also record other data to memory 502 that is relevant to reliability, including but not limited to maximum sensed operating temperatures, and detected indications of damage that might be related to hacking attempts. Such events may occur regardless of whether the integrated circuit is programmed by external circuitry, but the probability of such events may be greater when external circuitry is involved. The integrated circuit 102 may therefore use internal circuitry to store indicia of such events, even if the integrated circuit 102 is designed to have its transform key 306 programmed using internal circuitry.

If an integrated circuit 102 is returned, e.g., to a vendor or manufacturer, for a refund, the stored data regarding its history after manufacture may be retrieved from the one-time programmable memory 502. That data may support a decision to provide a refund or replacement if for example it shows no unusual events or reliability-related conditions occurred after manufacture. Conversely, that data may indicate that unusual and probably-damaging events or conditions did occur after manufacture. If these events or conditions were likely due to a user's actions, as may be determined for example by the number and/or pattern of events or conditions, then a refund or replacement request may be denied. The number of one-time programmable memory 502 elements may be limited, so the data may simply indicate a count of events meeting some predetermined threshold qualifications, in one embodiment.

In general, the features of autonomous internal programming and isolated storage of cryptographic transform keys into one-time programmable memory, combined with the storage of historical circuit context information, may advantageously resolve many communications security problems. For example, a "reset replay" attack may involve repeatedly resetting the power supply of a system and resuming a previous attack that might otherwise be ended when the attacked system has counted the attack attempts and taken countermeasures against further attacks. Such countermeasures may comprise deleting data stored in non-volatile memory, ignoring all future access attempts for a span of time, or even activation of internal self-destruct mechanisms to render itself entirely inoperable, for example. An attacked system that does not "remember" being previously attacked is less secure than one that does, and can respond accordingly.

Therefore, in one embodiment, a product comprising a number of integrated circuits that communicate with each other may use integrated circuits 102 that are capable of managing their own chip-to-chip communications security. For example, an integrated circuit 102 may store context information into its one-time programmable memory 502 when it is first activated (e.g., at the foundry where it is fabricated), and may subsequently store various context information into its one-time programmable memory 502 thereafter so that it will remember its history even when powered off and restarted. The context information may go beyond indicia of events or conditions likely to cause damage, to for example include cryptographic data related to communications security.

In another embodiment, no context information may be stored at the first activation of the integrated circuit 102 at all. Instead, a true noise-based random number generator onboard the integrated circuit 102 may generate a number of cryptographic keys that are subsequently used to secure inter-chip communications. Thus, inter-chip communications between integrated circuits 102 within a given product may be managed just as communications between unknown parties over an untrusted network are managed.

Figure 7:
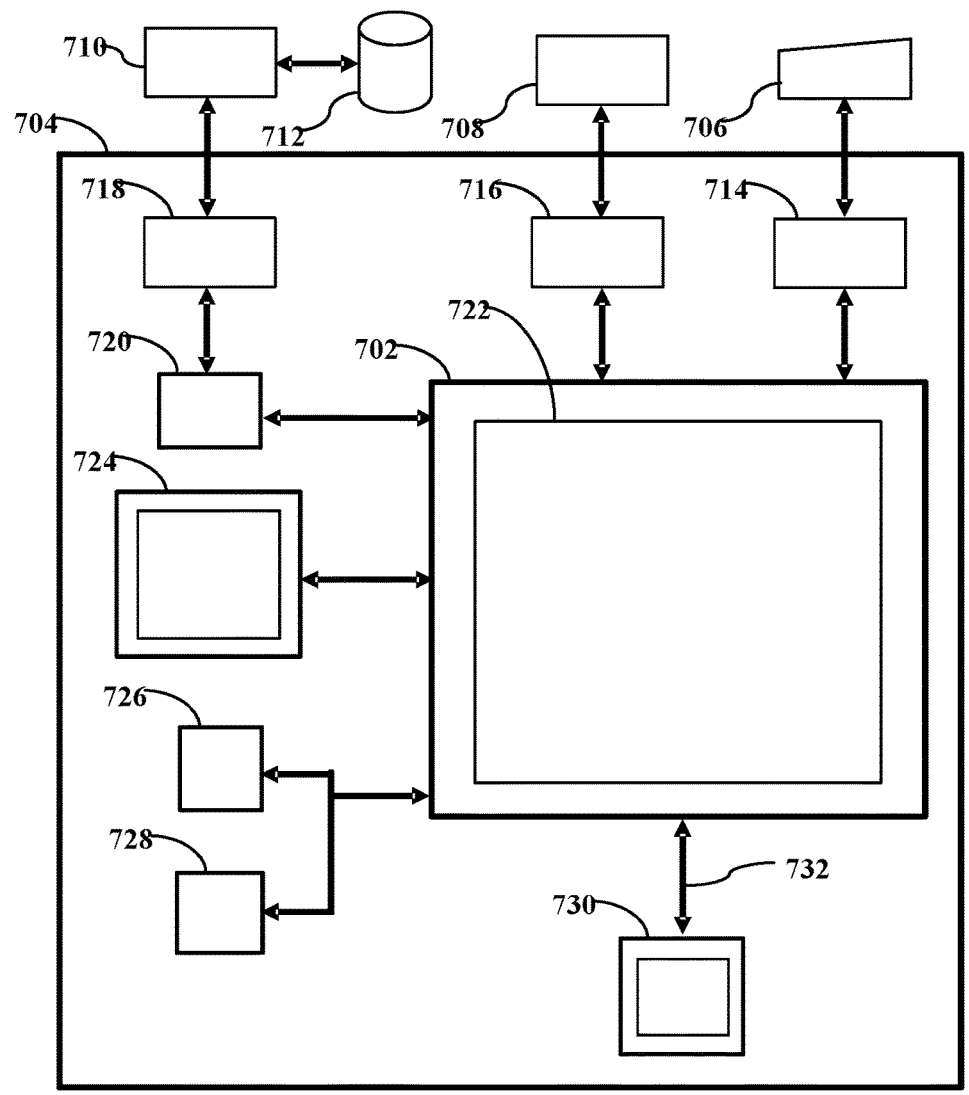
FIG. 7 shows a conventional autonomous product with little or no internal communications security.

FIG. 7 shows a conventional autonomous product 700 with little or no internal communications security. The product 700 may comprise a tablet, mobile phone, laptop computer, or any other type of device that is based around a system-on-a-chip (SOC) or processor 702. The processor 702 may be mounted on a printed circuit board 704 along with other components, and may interact with external users and processes, such as local user 706, locally connected process 708, and remotely connected process 710 which may connect to a remote database 712.

Various interfaces may handle communications between the processor 702 and other parties, such as local user interface 714, locally connected process interface 716, and remotely connected process interface 718. A remote communications chip 720 may handle data transfer between the remotely connected process interface 718 and the processor 702. Various processes 722 may be executed by the processor 702.

A bulk non-voltage storage device 724, such as a flash storage integrated circuit for example, may also reside on the printed circuit board 704 and exchange data with the processor 702. Other integrated circuits 726 and 728 may also be mounted on the printed circuit board 704 and exchange data with the processor 702. For simplicity, the term "flash storage" in this description may refer to any reprogrammable non-volatile memory technology, and is not necessarily limited to flash memory per se.

A local low-volume flash storage device 730 for sensitive data may also reside on the printed circuit board 704. Communications link 732 may transfer data between the low-volume non-volatile storage device 730 and the processor 702. Non-volatile storage device 730 may comprise a flash memory, as noted.

In some conventional instances, some form of relatively lightweight cryptography may be employed on either side of the communications link 732 to sensitive data flash storage device 730. In some instances, only certain portions of the processor 702 (sometimes referred to as a "secure zone" or security "sandbox") may have access to the flash storage device 730 for sensitive data. This approach to communications security is fundamentally flawed, and vulnerable to the "reset replay" attack previously described. An improved approach is provided that uses the transform-enabled cryptographic circuit and one-time programmable memory previously described.

Figure 8:
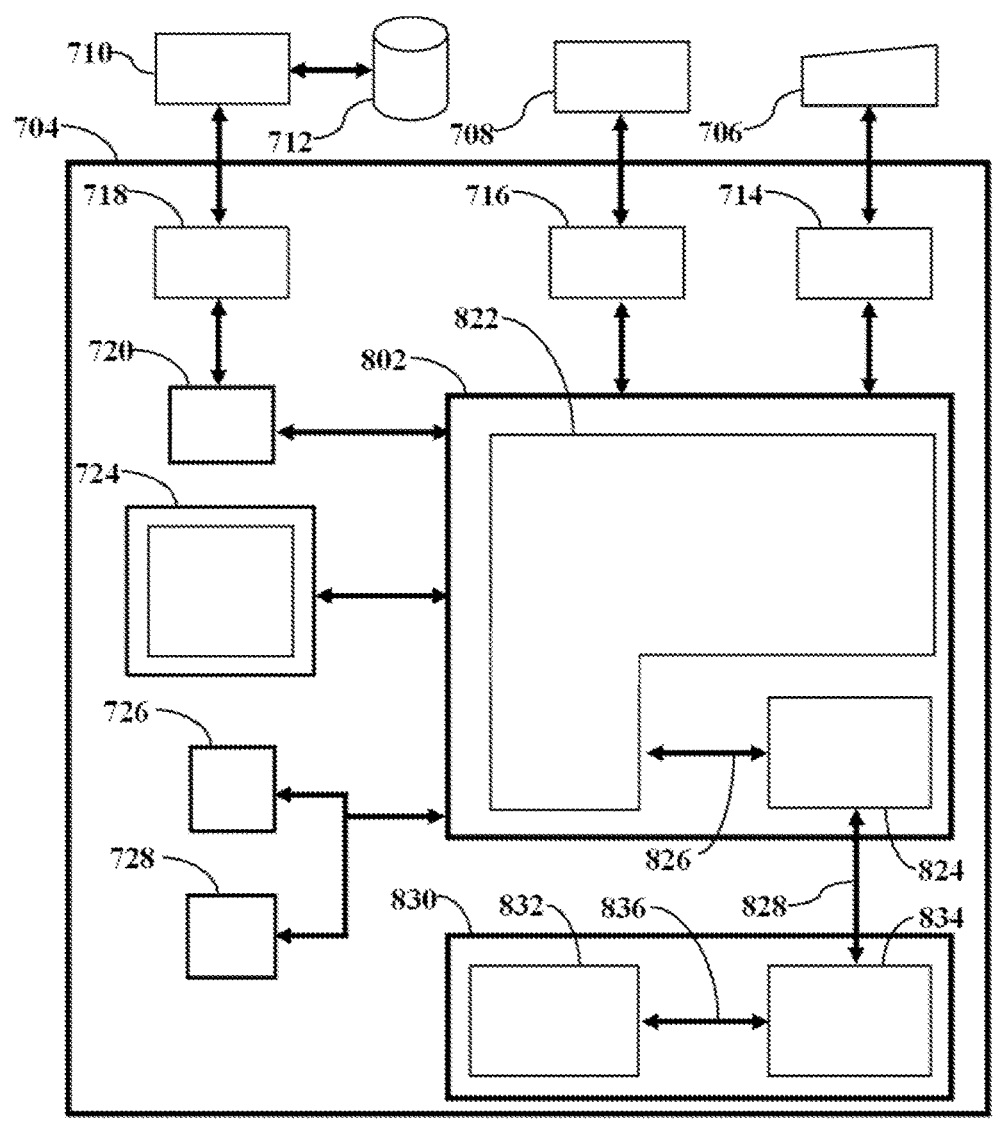
FIG. 8 shows an autonomous product with secure inter-chip communications, according to an embodiment.

FIG. 8 shows an autonomous product 800 with secure inter-chip communications, according to an embodiment. This product is similar to conventional product 700 but adds novel features to distinctly increase communications security. The processor 802 may include a first secure communications circuit block 824 that may mediate all on-chip communications 826 with processes 822 and all off-chip communications 828 with a separate integrated circuit 830 for secure non-volatile storage of sensitive data. The first secure communications circuit block 824 may have exclusive read/write access to its own one-time programmable memory, and may include internal circuitry for its programming.

Unlike the local low-volume flash storage device 730, integrated circuit 830 may include not only a non-volatile storage block 832 but also a second secure communications circuit block 834, on the same semiconductor chip. The second secure communications circuit block 834 may mediate all on-chip communications with the non-volatile storage block 832 and all off-chip communications 828 with the first secure communications circuit block 824. The second secure communications circuit block 834 may have exclusive read/write access to its own one-time programmable memory, and may include internal circuitry for its programming.

Figure 9:
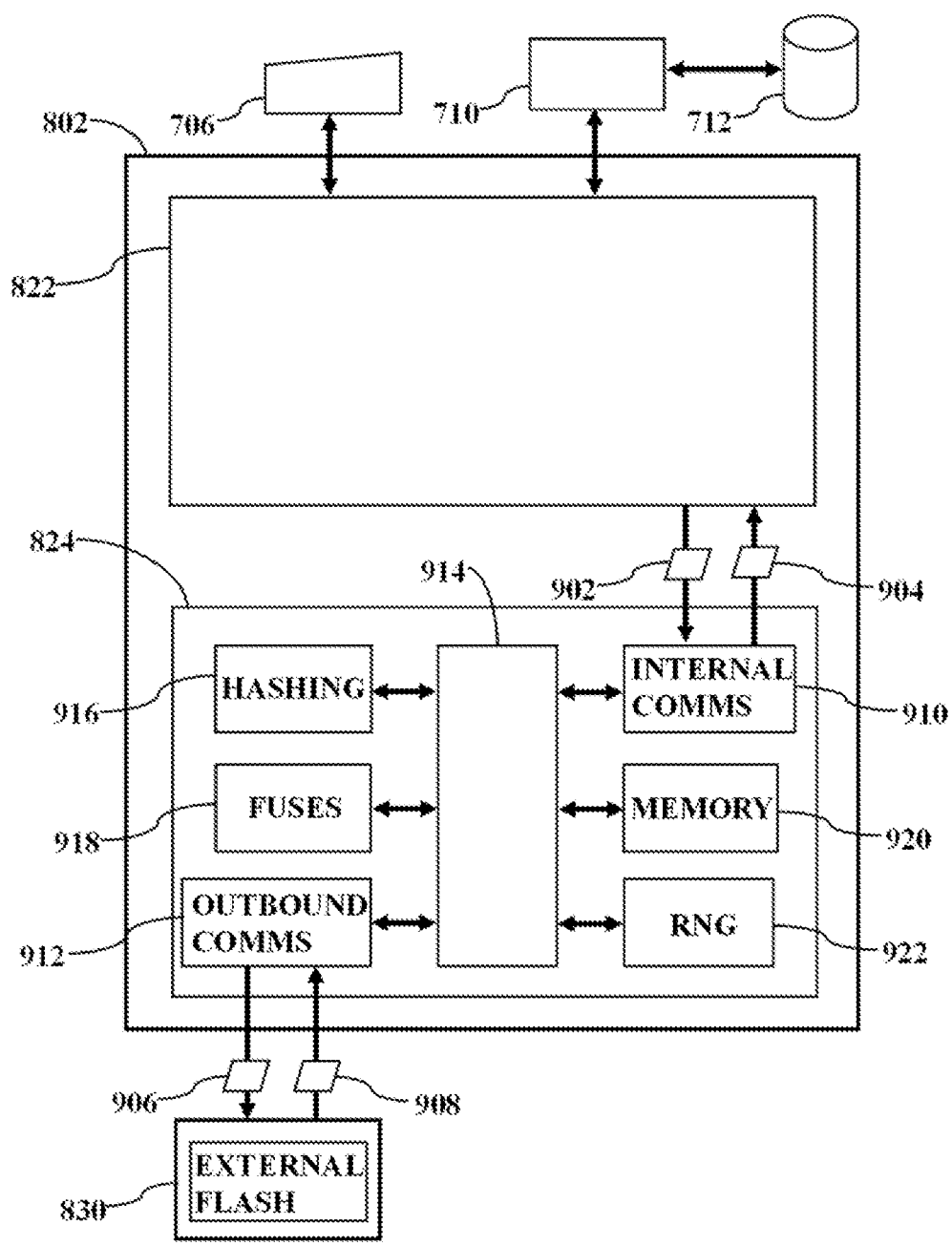
FIG. 9 shows the autonomous product processor in further detail, according to an embodiment.

FIG. 9 shows the autonomous product processor 802 in further detail, according to an embodiment. On-chip communications 826 may comprise messages 902 from the on-chip processes 822 to the first secure communications circuit block 824, and messages 904 to the on-chip processes 822 from the first secure communications circuit block 824. An incoming communications circuit block 910 in the first secure communications circuit block 824 may handle on-chip communications 826.

Off-chip communications 828 may comprise messages 906 from the first secure communications circuit block 824 to the second secure communications circuit block 834 inside integrated circuit 830, and messages 908 from the second secure communications circuit block 834 to the first secure communications circuit block 824. An outgoing communications circuit block 912 in the first secure communications circuit block 824 may handle off-chip communications 828.

Control unit 914 may comprise circuitry that coordinates the operations of the first secure communications block 824. Hashing block 916 may calculate the results of a one-way function applied to an input. Fuse block 918 may store data into a one-time programmable memory, which may include micro-fuses, anti-fuses, or other non-volatile memory elements. Fuse block 918 may use internal circuitry to generate programming pulses, as previously described. Memory block 920 may store data used for managing communications security. Random number generator (RNG) 922 may generate random numbers, as opposed to pseudorandom numbers, as will be described.

Figure 10:
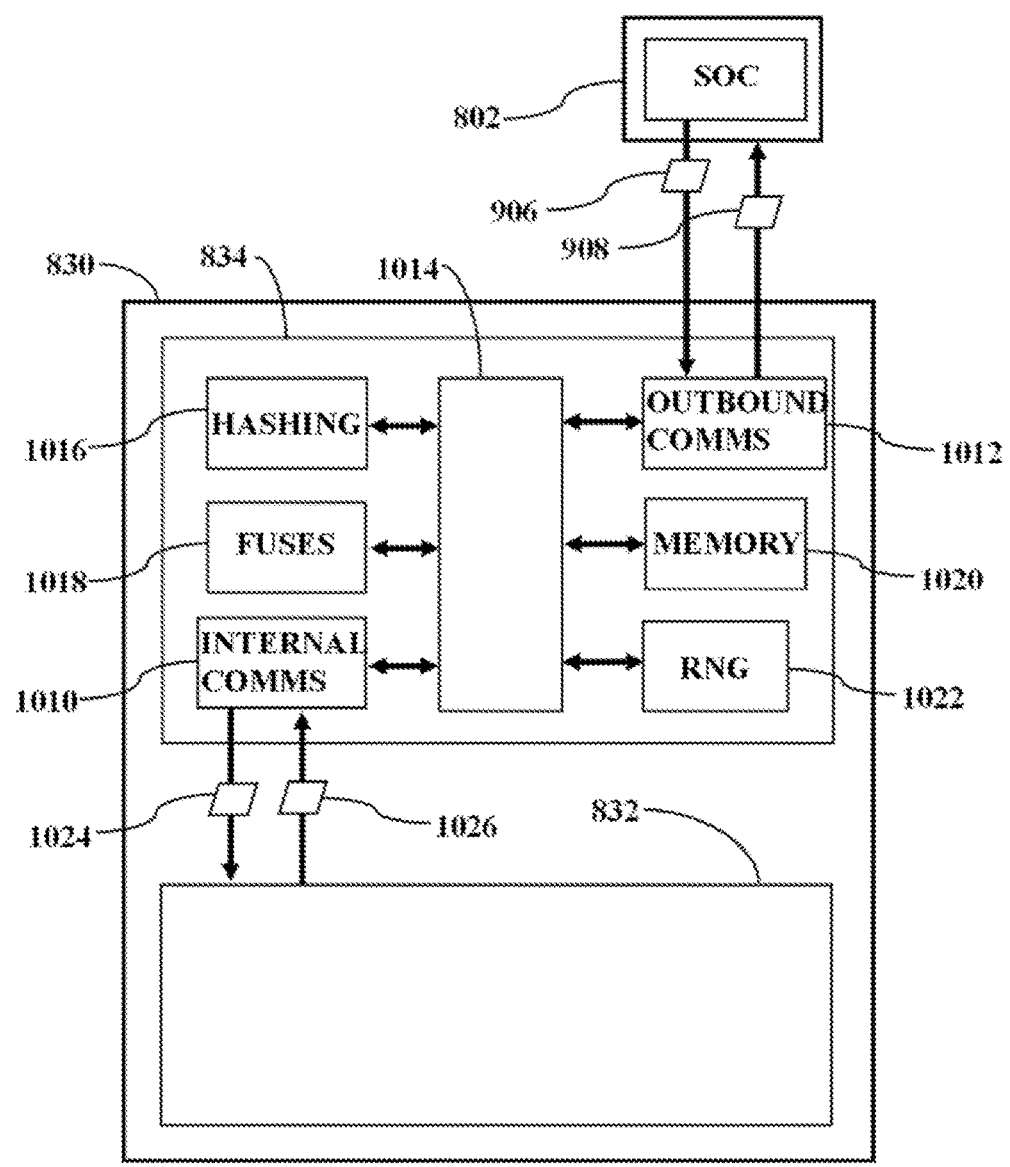
FIG. 10 shows an integrated circuit with secure inter-chip communications and non-volatile memory, according to an embodiment.

FIG. 10 shows the integrated circuit 830 in further detail, according to an embodiment. Communications 836 between the second secure communications circuit block 834 and the non-volatile storage block 832 may comprise messages 1024 from the second secure communications circuit block 834 to the non-volatile storage block 832, and messages 1026 to the second secure communications circuit block 834 from the non-volatile storage block 832.

An incoming communications circuit block 1010 in the second secure communications circuit block 834 may handle on-chip communications 836. An outgoing communications circuit block 1012 in the second secure communications circuit block 834 may handle off-chip communications 828.

Control unit 1014 may comprise circuitry that coordinates the operations of the second secure communications circuit block 834, and may be similar to the control unit 914 of the first secure communications block 824. Hashing block 1016, fuse block 1018, memory block 1020, and random number generator 1022 may also be similar to their counterparts in the first secure communications block 824.

In the embodiment of FIGS. 8-10, communications between the processor 802 and the external storage 832 are cryptographically protected based on cryptographic keys stored in the one-time programmable memories of the secure communications blocks 824 and 834. Other security-related information useful for preventing a reset replay attack may also be stored in the one-time programmable memories, and so would not be cleared during a power reset. The data may be stored in the one-time programmable memories using internal circuitry, so there is no chance that the one-time programmable memory elements may be hacked by external means. The data stored in the one-time programmable memories and used in the one-way functions encode and validate messages going between the processor and the external non-volatile storage. Unlike the product 700 of FIG. 7, therefore, communications between the processor and the external non-volatile storage cannot be simply monitored or replaced with falsified messages.

Although logic circuitry and flash memory cannot presently be integrated on the same semiconductor chip if the logic devices are under 28 nm in size, micro-fuses and anti-fuses may be integrated onto a flash memory chip. The secure communications circuit blocks are therefore able to include both logic circuitry below 28 nm in size and one-time programmable memory elements comprising micro-fuses and/or anti-fuses.

Figure 11:
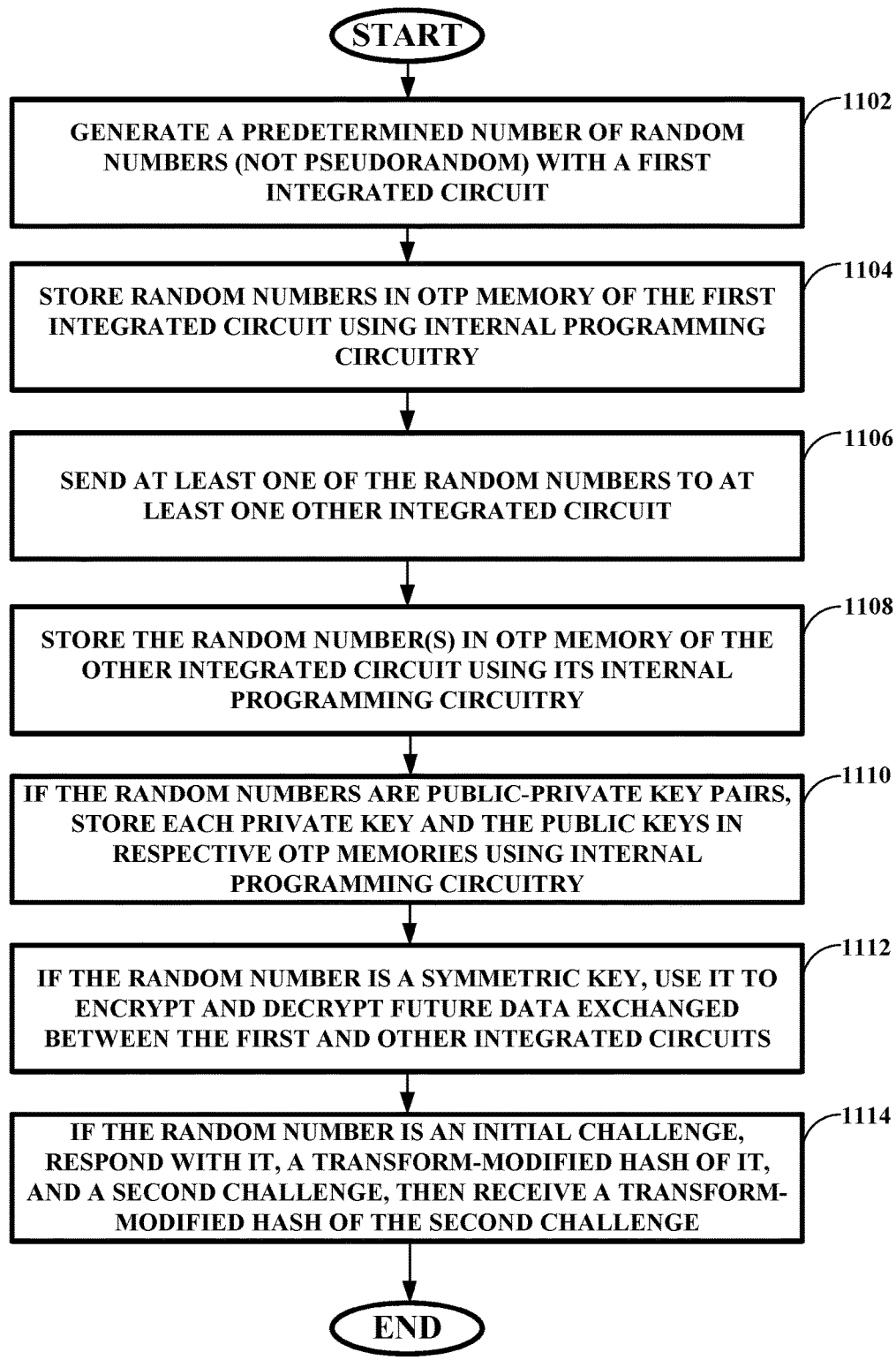
FIG. 11 shows a flowchart of a secure inter-chip communications methodology, according to an embodiment.

FIG. 11 shows a flowchart of a secure inter-chip communications methodology 1100, according to an embodiment. This methodology may be implemented by the circuitry described in FIGS. 8-10. Although described here with respect to different integrated circuits assembled into a single product on a single printed circuit board, the methodology is not limited in this respect, and may be applied to integrated circuits in entirely different products that interact over a network.

At 1102, the methodology may begin with a random number generator in a secure communications circuit block, such as the RNG 922 in the first secure communications circuit block 824 for example. Unlike a pseudorandom number generator, which produces numbers that appear to be random but are actually reproducibly predetermined by a particular algorithm, the exemplary RNG may generate numbers that are indeed as random as possible for the methodology. In one embodiment, the RNG may amplify noise from an electronic device, such as a reverse-biased diode, and feed such amplified noise into a logic circuit to produce a substantially random stream of bits.

The RNG may collect this stream of bits into a register of predetermined size to produce a random string of binary numbers. The register may reside in the memory block 920 for example. The RNG may further put this random string of binary numbers through a one-way function or hashing algorithm as previously described, to further jumble the random string of binary numbers into an output random number that is in binary form and of a given length. The one-way function may be implemented in the hashing block 916 for example. This hashing may be advantageous if for some reason the RNG outputs a string of binary numbers that are all zeroes or all ones, which may prove cryptographically weak in some circumstances.

The output random numbers generated by the RNG may serve a variety of cryptographic purposes. The output random number may comprise a user passphrase for controlling an information stream, as previously described. The output random number may also comprise a nonce, or arbitrary single-time use number for creating secure communications sessions between communicating parties by excluding the possibility of replay attacks. The output random number may also be used as a cryptographic key. The output random number may also be used as a salt that is concatenated onto other output random numbers used for various purposes.

At 1104, the methodology may store the output random numbers generated by the RNG into the one-time programmable memory of the secure communications circuit block, such as fuse block 918 for example. The output random numbers may be programmed into the one-time programmable memory elements using internal circuitry that generates the programming pulses. The stored random numbers may thus not be externally visible or accessible, but may be useable only by the corresponding secure communications circuit block, such as the first secure communications block 824 for example.

At 1106, the methodology may transmit at least one of the output random numbers another secure communications circuit block, such as the second secure communications block 834 for example. More generally, the output random numbers may be transmitted to any number of other secure communications circuit blocks, which may include those in other products for example. At 1108, the methodology may store the transmitted random numbers into corresponding one-time programmable memories of the other secure communications circuit blocks.

At 1110, in one embodiment, a first integrated circuit, such as the first secure communications circuit block 824, may generate two random sets of public-private key pairs. The first integrated circuit may then program one of the private keys and both of the public keys into its one-time programmable memory using its internal programming circuitry. The first integrated circuit may then transmit the other private key and both of the public keys to a second integrated circuit, such as the second secure communications circuit block 834. The second integrated circuit may then program the private key it has received, and both of the public keys it has received, into its one-time programmable memory using its internal programming circuitry.

All subsequent communications between the first integrated circuit and the second integrated circuit, after trust has been established between them, may utilize the public-private key functionality for secure communications. The initial storage and exchange of the context information (e.g., the cryptographic keys) may occur at the factory where a particular product 800 is manufactured. For example, when a printed circuit board is first populated with its various integrated circuits, the processor may trigger the methodology and secure non-volatile storage integrated circuits may respond. The initial storage and exchange of the context information may occur later however, such as when a new user first uses the product.

At 1112, in another embodiment, the methodology may use symmetric keys in place of the public-private key pairs previously described. In a further embodiment, the methodology may use the private-public key pairs to exchange a randomly-generated short-term symmetric key, as is currently done in the HTTPS protocol to create a secure channel over an insecure network. This approach is therefore a combination of the operations 1110 and 1112.

At 1114, in another embodiment, a first integrated circuit, such as the first secure communications circuit block 824, may transmit an authorization request to a second integrated circuit, such as the second secure communications circuit block 834, along with a random number as an initial challenge. The second integrated circuit may respond with the initial challenge, a transform-modified hash of the initial challenge, and a new random number as a second challenge. The first integrated circuit may respond with all the data it received from the second integrated circuit, plus a transform-modified hash of the second challenge.

The initial challenge is sent as cleartext in this example, but that does not matter because it is the transform-modified hash of that number that is used as a block cipher by both sides. This secure communications initialization process may occur when the printed circuit board is first populated with the various integrated circuits, as previously described. In one example, the initial establishment of secure communications may occur via direct wiring, while subsequent communications may be via wireless means (including optical). The initialization may also occur thereafter.

Although described in terms of only two secure communications circuit blocks, the methodology is not so limited. The methodology may build a secure network of any number of integrated circuits. In one example, the methodology may treat one integrated circuit as a master that always initiates the secure communications methodology, and may treat the other integrated circuits as slaves that respond to the initiation request but do not initiate such requests, but the disclosure is not limited in this regard. Further, the methodology may build a secure network of products in a network as well, with each product potentially having previously secured its own internal network, for example.

The secure communications methodology described may enable the processing of an information stream, which may comprise a blockchain.

The present inventor has realized, among other things, that the transformed hash calculator may create a unique cryptographically defined and verifiable processor identifier or "CpuID" for each ASIC instance. The CpuID enables a particular hardware originator of an information stream or message to be reliably determined. This contrasts with the exemplary use of a ChainID to reliably denote a particular information stream or network destination, as previously described.

Figure 12:
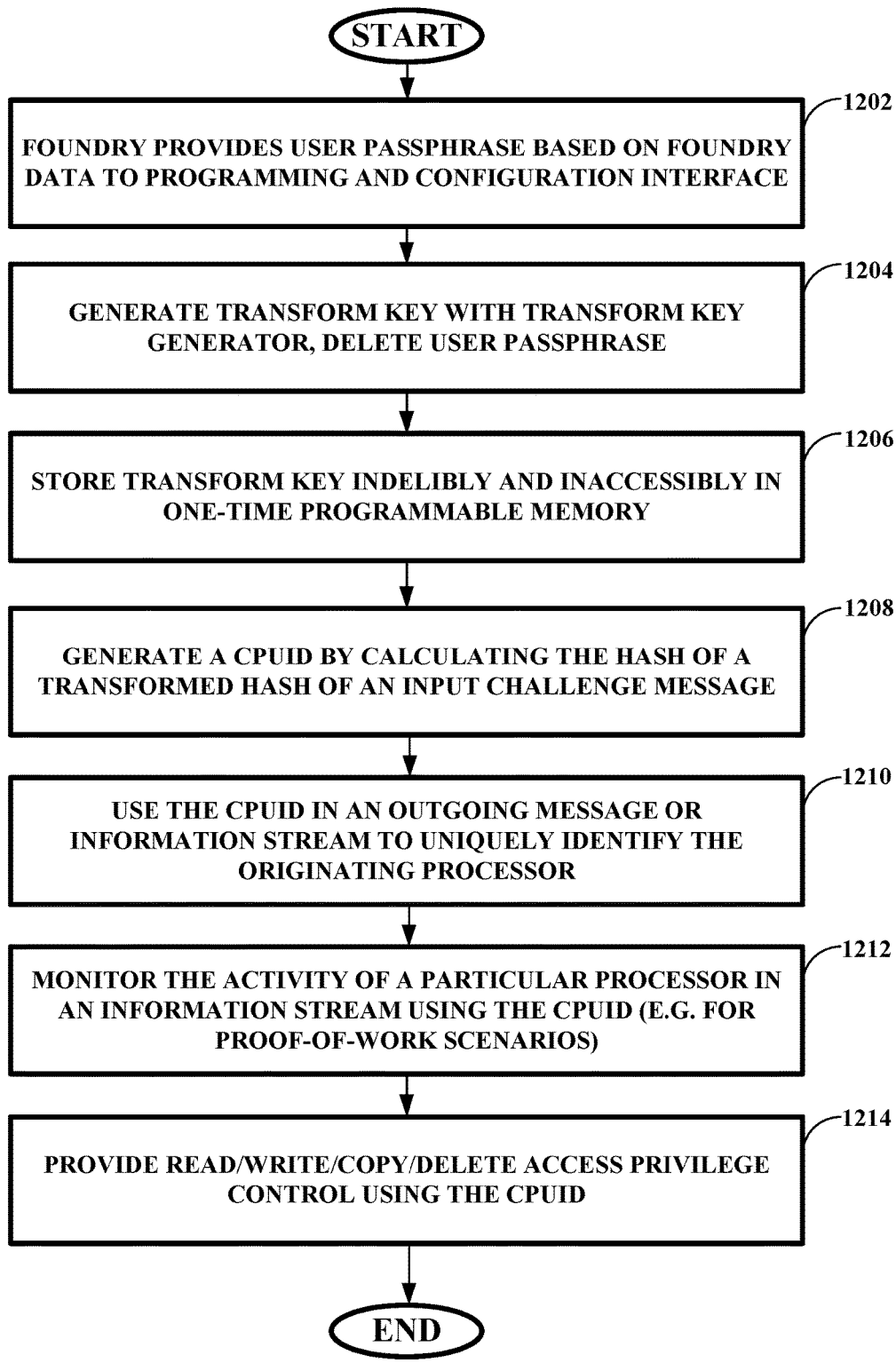
FIG. 12 shows a flowchart of a methodology for calculating a cryptographically secure and verifiable unique processor identifier, according to an embodiment.

FIG. 12 shows a flowchart of a methodology 1200 for calculating a cryptographically secure and verifiable unique processor identifier, according to an embodiment. In one example, the ASIC may process a predetermined input message 202 of 256 bits to produce a hash 206, and then process the hash 206 by an adjustable or customizably programmable transformation function 208 which uses a configuration key 108 to generate a transformed hash 210, as previously described. The ASIC may process transformed hash 210 through a second hashing block 212 to produce a hash of the transformed hash of the input message 214, which may serve as the CpuID.

The distinction in this embodiment, at 1202, is that the configuration key 108 may be based on for example a manufacture date, a wafer lot number, a wafer number, x and y (row/column) coordinates or indices for each die on a wafer, or on other data provided by the foundry in a user passphrase. At 1204, the ASIC may generate a transform key with a transform key generator and delete the user passphrase as previously described. At 1206, the configuration key 108 for each ASIC, or a transform key derived therefrom, may be stored into a one-time programmable memory in the ASIC in isolation by a foundry that manufactures the ASIC.

Each ASIC instance may therefore generate the unique CpuID whenever needed, at 1208, merely by processing the predetermined input message 202. The CpuID allows a given ASIC instance to be securely and remotely identified across an untrusted network. The predetermined input message 202 may be a commonly known and widely used or even standardized "identify yourself" interrogation command string, or a customized challenge message.

Although the ASIC described may be used to process an information stream at high speed, a simplified and thus inexpensive version may suffice when its primary function of interest is to administer secure data. That is, the CpuID calculating hardware may be a stripped-down relatively slow version of the more general transform-modified OWF hardware previously described. It may not need to be implemented in the main datapath for high-speed calculations to serve as essentially a very cryptographically secure internal dongle. That is, the ASIC may compute the CpuID to process an incoming message, such as an interrogation to prove that it has a valid transform block, or it may use the CpuID in an outgoing message, at 1210, to identify which ASIC instance originated the outgoing message.

The particular ASIC that establishes a new information stream, such as a blockchain, may be considered an "author" of the information stream. Similarly a particular ASIC that creates a new message such as a blockchain entry may be identified as the "author" of the entry. An ASIC used to process blockchains for example may be directly identified as the processor that performed the work that is the basis of a proof-of-work system. This is distinct from the present bitcoin-related practice of identifying a person who claims to have done the work.

As a result, at 1212, this feature enables monitoring of which ASICs have been mining a given blockchain, to for example pay contracted miners who have been issued processors by a contractor to perform prescribed work for that contractor. Similarly, if an unknown person is mining a blockchain with unauthorized ASICs, intrusion detection is possible via the CpuID feature. Since no user passphrase is passed around, there is no chance that a bogus clone copy of the blockchain could be created, unless the one-way function is defeated. That possibility is very unlikely, since the one-way function always throws away some information and leaves only a noisy-appearing but verifiable residue behind.

The CpuID calculator may be useful in consumer electronics items. For example, an ASIC could for example be used in a phone so that the manufacturer or reseller could burn a transform block into each such device for tracking purposes. Such devices could be linked to other devices or accounts in a network; for example, the phone could be securely and verifiably linked to a license in a music distribution system (which itself may be identified by a specific ChainID). This hardware-level internal security could enable many different uses, essentially providing system administrator type access privilege control (e.g., read/write/copy/delete) to files on a memory card or at a network location, at 1214. This feature could be useful for securely managing licensed software updates by software makers/vendors, such as those providing operating systems or anti-virus programs for example.

The present inventor has realized, among other things, that the transformed hash calculator may be used to verify that a given instance of a cryptographic ASIC is still valid, and can process input messages properly. That is, the transform integrity of the ASIC may be verified using a few simple calculations and comparisons. This disclosure thus provides a cryptographic ASIC and method for autonomously storing a unique internal identifier into a one-time programmable memory in the ASIC in isolation, by a foundry or a user, for this purpose. The unique internal identifier may comprise the CpuID previously described, or a user passphrase, transform key, or configuration key, or various combinations of these values that are necessary to correctly process input messages.

Figure 13:
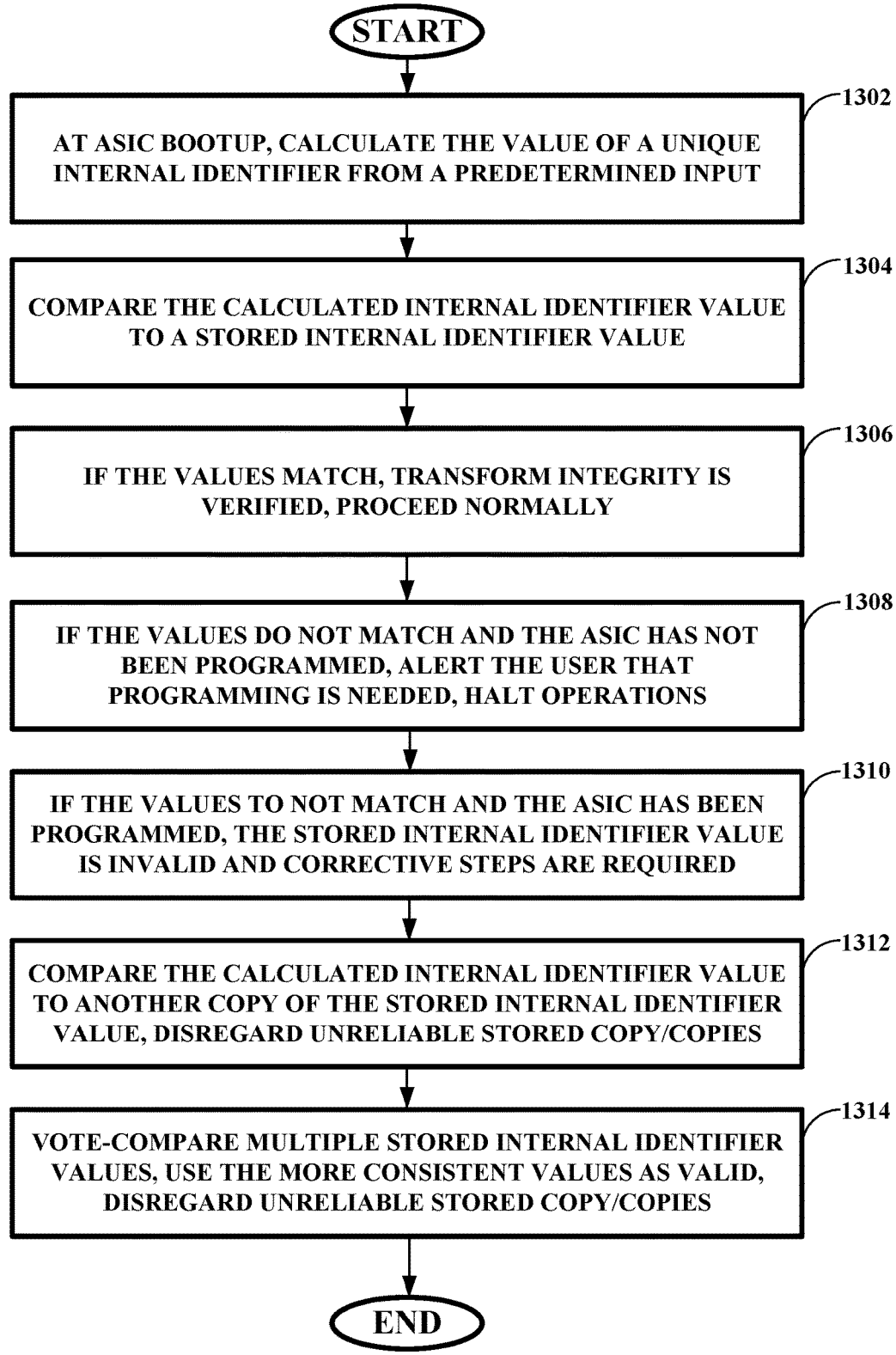
FIG. 13 shows a flowchart of a methodology for verifying the transform integrity of a cryptographic integrated circuit, according to an embodiment.

FIG. 13 shows a flowchart of a methodology 1300 for verifying the transform integrity of a cryptographic integrated circuit, according to an embodiment. When powered on, at 1302, the ASIC calculates the value of the unique internal identifier from a predetermined input and compares, at 1304, the calculated identifier value to the stored internal identifier value. A match between the calculated internal identifier value and the stored internal identifier value indicates the stored internal identifier value is valid, as calculating a correct value by chance is cryptographically infeasible. In this case, at 1306, the ASIC transform integrity is verified and normal operation may proceed.

A mismatch however indicates the stored internal identifier value is invalid or has not yet been stored because the ASIC has not been programmed. In the latter case, at 1308, the ASIC may issue an error message indicating that it needs to be programmed, and normal operations are halted to allow for such programming. However, a mismatch may also occur, at 1310, because one-time programmable memory components undergo natural aging, or because the stored internal identifier value has been altered, perhaps by damage from static electricity discharge or by unauthorized access attempts by hackers. In either case, a mismatch indicates the ASIC will not process input messages properly, and available corrective steps are required.

Normally, a programmed ASIC that is proven incapable of properly calculating a given transform value should be disabled so it cannot initialize, nor process messages erroneously, and an error message should be provided. However, the present inventor has recognized that the failure of a single copy of a stored internal identifier value to match a calculated internal identifier value need not doom the ASIC to this fate. In one embodiment, at 1312, the ASIC may instead compare the calculated internal identifier value to another copy or copies of the stored internal identifier value, and disregard unreliable copies of the stored internal identifier.

The ASIC, at 1314, may also compare multiple copies of the stored identifier in a voting scheme to determine their validity. For example, if two out of three stored identifier values match each other and a calculated identifier value, that is a reasonable indication that the third stored identifier value that does not match the calculated identifier value is invalid and should be disregarded. This feature may help assure a purchaser that the ASIC will be useful as along as a confirmed good copy of the stored internal identifier value is available in its one-time programmable storage. The confirmed valid lifetime of the ASIC thus may be extended far beyond the useful lifetime of a single copy of the stored internal identifier. When the last confirmed good copy of the stored internal identifier is gone, the ASIC may return an error value at bootup, indicating the ASIC is hopelessly damaged, stopping the bootup process.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

The term tool can be used to refer to any apparatus configured to perform a recited function. For example, tools can include a collection of one or more components and can also be comprised of hardware, software or a combination thereof. Thus, for example, a tool can be a collection of one or more software components, hardware components, software/hardware components or any combination or permutation thereof. As another example, a tool can be a computing device or other appliance on which software runs or in which hardware is implemented.

Figure 14:
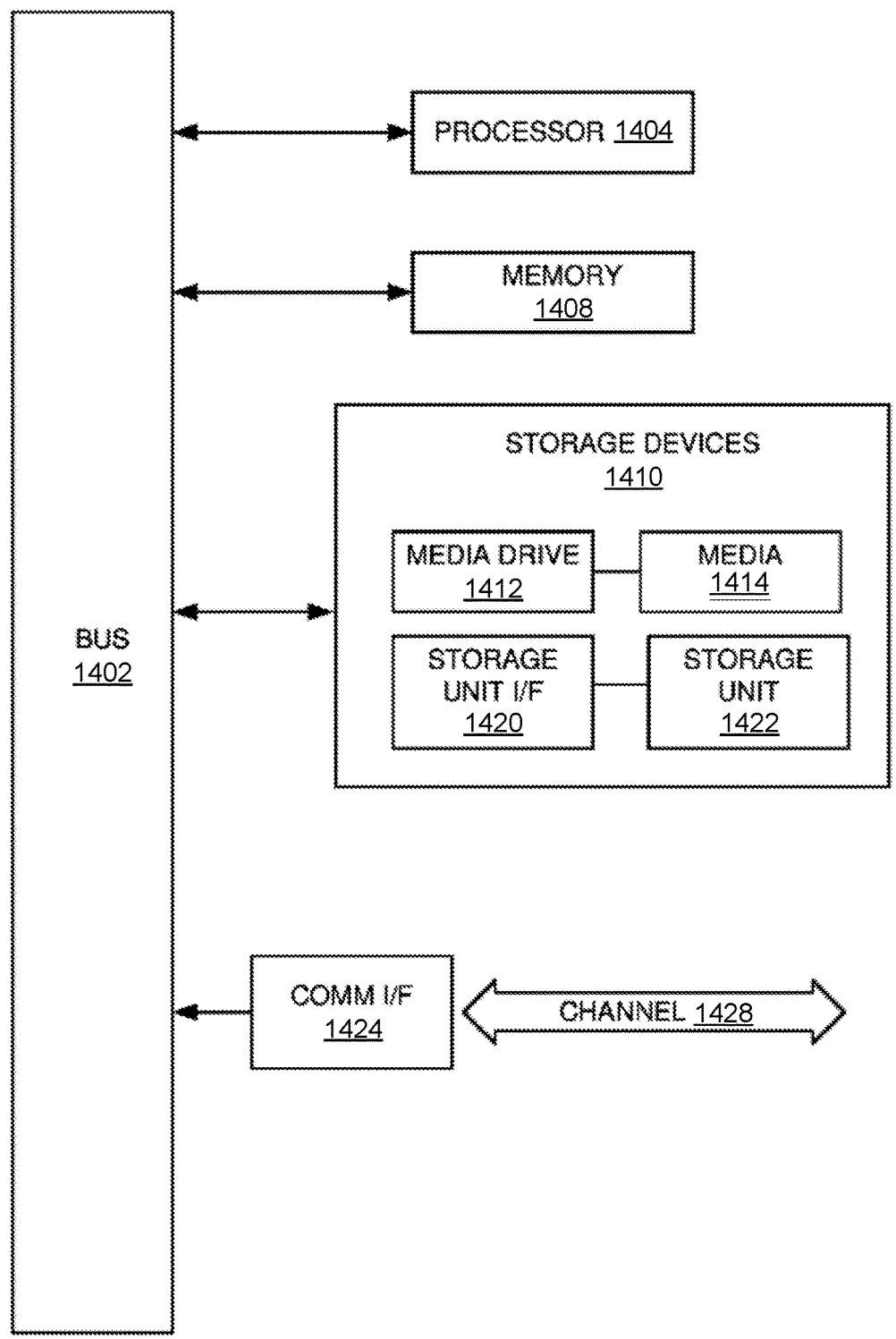
FIG. 14 shows a computing component that may carry out the functionality described herein, according to an embodiment.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, programmable logic arrays (PLAs), programmable array logics (PALs), complex programmable logic devices (CPLDs), FPGAs, logical components, software routines or other mechanisms might be implemented to make up a component. Hardware logic, including programmable logic for use with a programmable logic device (PLD) implementing all or part of the functionality previously described herein, may be designed using traditional manual methods or may be designed, captured, simulated, or documented electronically using various tools, such as Computer Aided Design (CAD) programs, a hardware description language (e.g., VHDL or AHDL), or a PLD programming language. Hardware logic may also be generated by a non-transitory computer readable medium storing instructions that, when executed by a processor, manage parameters of a semiconductor component, a cell, a library of components, or a library of cells in electronic design automation (EDA) software to generate a manufacturable design for an integrated circuit. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the technology are implemented in whole or in part using software, in one embodiment, these software elements can be implemented to operate with a computing or processing component capable of carrying out the functionality described with respect thereto. One such example computing component is shown in FIG. 14. Various embodiments are described in terms of this example-computing component 1400. After reading this description, it will become apparent to a person skilled in the relevant art how to implement the technology using other computing components or architectures.

FIG. 14 shows a computing component that may carry out the functionality described herein, according to an embodiment. Computing component 1400 may represent, for example, computing or processing capabilities found within desktop, laptop and notebook computers, hand-held computing devices (personal digital assistants (PDAs), smart phones, cell phones, palmtops, etc.), mainframes, supercomputers, workstations or servers, or any other type of special-purpose computing devices as may be desirable or appropriate for a given application or environment. Computing component 1400 might also represent computing capabilities embedded within or otherwise available to a given device. For example, a computing component might be found in other electronic devices such as, for example, digital cameras, navigation systems, cellular telephones, portable computing devices, modems, routers, wireless application protocols (WAPs), terminals and other electronic devices that might include some form of processing capability.

Computing component 1400 might include, for example, one or more processors, controllers, control components, or other processing devices, such as a processor 1404. Processor 1404 might be implemented using a special-purpose processing engine such as, for example, a microprocessor, controller, or other control logic. In the illustrated example, processor 1404 is connected to a bus 1402, although any communication medium can be used to facilitate interaction with other components of computing component 1400 or to communicate externally.

Computing component 1400 might also include one or more memory components, simply referred to herein as main memory 1408. For example, random access memory (RAM) or other dynamic memory, might be used for storing information and instructions to be executed by processor 1404. Main memory 1408 might also be used for storing temporary variables or other intermediate information during execution of instructions to be executed by processor 1404. Computing component 1400 might likewise include a read only memory (ROM) or other static storage device coupled to bus 1402 for storing static information and instructions for processor 1404.

The computing component 1400 might also include one or more various forms of information storage mechanism 1410, which might include, for example, a media drive 1412 and a storage unit interface 1420. The media drive 1412 might include a drive or other mechanism to support fixed or removable storage media 1414. For example, a hard disk drive, a floppy disk drive, a magnetic tape drive, an optical disk drive, a compact disc (CD) or digital versatile disk (DVD) drive (read-only or read/write), or other removable or fixed media drive might be provided. Accordingly, storage media 1414 might include, for example, a hard disk, a floppy disk, magnetic tape, cartridge, optical disk, a CD or DVD, or other fixed or removable medium that is read by, written to or accessed by media drive 1412. As these examples illustrate, the storage media 1414 can include a computer usable storage medium having stored therein computer software or data.

In alternative embodiments, information storage mechanism 1410 might include other similar instrumentalities for allowing computer programs or other instructions or data to be loaded into computing component 1400. Such instrumentalities might include, for example, a fixed or removable storage unit 1422 and an interface 1420. Examples of such storage units 1422 and interfaces 1420 can include a program cartridge and cartridge interface, a removable memory (for example, a flash memory or other removable memory component) and memory slot, a personal computer memory card international association (PCMCIA) slot and card, and other fixed or removable storage units 1422 and interfaces 1420 that allow software and data to be transferred from the storage unit 1422 to computing component 1400.

Computing component 1400 might also include a communications interface 1424. Communications interface 1424 might be used to allow software and data to be transferred between computing component 1400 and external devices. Examples of communications interface 1424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1424 might typically be carried on signals, which can be electronic, electromagnetic (which includes optical) or other signals capable of being exchanged by a given communications interface 1424. These signals might be provided to communications interface 1424 via a channel 1428. This channel 1428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1408, storage unit 1420, media 1414, and channel 1428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1400 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A cryptographic integrated circuit for managing operations on an information stream, comprising:
   a transform key generator configured to derive a transform key from a temporary copy of a user passphrase;
   a one-time programmable memory configured to store the transform key in isolation using programming pulses from internal circuitry;
   a first one-way function (OWF) circuit block configured to generate a hash of an input message;
   a programmable transformation function circuit block configured to be customized by the transform key and transform the hash into a transformed hash; and
   a second OWF circuit block configured to generate a second hash of the transformed hash as an output result.

2. The circuit of claim 1, wherein the information stream is a blockchain.

3. The circuit of claim 1, wherein the programmable transformation function circuit block performs a customized transformation function comprising at least one of bit inversion and bit transposition.

4. The circuit of claim 1, wherein the transform key enables at least one of identifying the information stream and processing an input message from the information stream into the output result.

5. The circuit of claim 1, wherein the transform key is derived by processing the user passphrase through at least one OWF circuit block.

6. The circuit of claim 4, wherein the identifying comprises generating an identifier by processing a predetermined input message.

7. The circuit of claim 1, wherein knowledge of the transform key enables replication of the circuit.

8. The circuit of claim 1, wherein the user passphrase enables creation of the information stream.

9. The circuit of claim 1, wherein the transform key is derived and stored during manufacture of the circuit.

10. The circuit of claim 1, wherein the transform key is derived and stored after manufacture of the circuit.

11. A cryptographic method for managing operations on an information stream, the method comprising:
   deriving a transform key from a temporary copy of a user passphrase;
   storing the transform key in a one-time programmable memory in isolation using programming pulses from internal circuitry;
   processing an input message from the information stream by:
      hashing the input message to obtain an input message hash;

performing a customized transforming of the input message hash using the transform key, to obtain a transformed hash; and hashing the transformed hash into an output result; and creating the information stream with the output result, based on the user passphrase.

12. The method of claim 11, wherein the information stream is a blockchain.

13. The method of claim 11, wherein the transforming comprises at least one of bit inversion and bit transposition.

14. The method of claim 11, wherein the transform key is derived by processing the user passphrase through at least one one-way function (OWF).

15. The method of claim 14, wherein the transform key is derived from the user passphrase by a sequential application of at least two OWFs to the user passphrase.

16. The method of claim 11, further comprising identifying the information stream using an identifier generated by processing a predetermined input message.

17. The method of claim 11, wherein knowledge of the transform key enables replication of the method.

18. The method of claim 11, wherein the transform key is derived and stored during manufacture of a circuit that executes the method.

19. The method of claim 11, wherein the transform key is derived and stored after manufacture of a circuit that executes the method.

20. A system for managing operations on an information stream, the system comprising:

means for deriving a transform key from a temporary copy of a user passphrase;

means for storing the transform key in a one-time programmable memory in isolation using programming pulses from internal circuitry;

means for processing an input message from the information stream by:

hashing the input message to obtain an input message hash;

performing a customized transforming of the input message hash using the transform key, to obtain a transformed hash; and hashing the transformed hash into an output result; and means for creating the information stream with the output result based on the user passphrase.

* * * * *